US008340289B2

(12) United States Patent
Adams et al.

(10) Patent No.: US 8,340,289 B2
(45) Date of Patent: Dec. 25, 2012

(54) SYSTEM AND METHOD FOR PROVIDING AN INDICATION OF RANDOMNESS QUALITY OF RANDOM NUMBER DATA GENERATED BY A RANDOM DATA SERVICE

(75) Inventors: Neil P. Adams, Waterloo (CA); Michael G. Kirkup, Waterloo (CA); Herbert A. Little, Waterloo (CA); Michael Rybak, Kitchener (CA); David F. Tapuska, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1498 days.

(21) Appl. No.: 11/237,723

(22) Filed: Sep. 29, 2005

(65) Prior Publication Data

US 2007/0071238 A1    Mar. 29, 2007

(51) Int. Cl.
*H04L 9/00*    (2006.01)
(52) U.S. Cl. ............. 380/46; 713/168; 713/172; 726/26
(58) Field of Classification Search .................. 713/179, 713/180, 171; 380/21, 23, 24, 25, 49, 50, 380/55, 56, 444, 46; 395/187; 702/186; 726/1–36; 708/250
See application file for complete search history.

(56) References Cited

U.S. PATENT DOCUMENTS

| 4,615,002 | A | | 9/1986 | Innes |
| 4,908,770 | A | | 3/1990 | Breault et al. |
| 5,608,800 | A | * | 3/1997 | Hoffmann et al. ............ 713/181 |
| 5,625,690 | A | | 4/1997 | Michel et al. |
| 5,689,565 | A | | 11/1997 | Spies et al. |
| 5,724,425 | A | | 3/1998 | Chang et al. |
| 5,724,556 | A | | 3/1998 | Souder et al. |
| 5,978,484 | A | | 11/1999 | Apperson et al. |
| 6,021,491 | A | * | 2/2000 | Renaud ......................... 713/179 |
| 6,038,551 | A | | 3/2000 | Barlow et al. |

(Continued)

FOREIGN PATENT DOCUMENTS

AU    9736815    2/1998

(Continued)

OTHER PUBLICATIONS

Anonymous "User Guide: Online Banking" Internet Article, Jul. 10, 2004, Retrieved from the Internet: URL: http://web.archive.org/web/20050308164449/www.verisign.com/products-services/security-services/code-signing/symbian-content-signing/index.html.

(Continued)

*Primary Examiner* — Pramila Parthasarathy
(74) *Attorney, Agent, or Firm* — Hanley, Flight & Zimmerman, LLC

(57) ABSTRACT

A system and method for providing an indication of randomness quality of random number data generated by a random data service. The random data service may provide random number data to one or more applications adapted to generate key pairs used in code signing applications, for example. In one aspect, the method comprises the steps of: retrieving random number data from the random data service; applying one or more randomness tests to the retrieved random number data to compute at least one indicator of the randomness quality of the random number data; associating the at least one indicator with at least one state represented by a color; and displaying the color associated with the at least one indicator to a user. The color may be displayed in a traffic light icon, for example.

14 Claims, 13 Drawing Sheets

U.S. PATENT DOCUMENTS

| | | | |
|---|---|---|---|
| 6,067,582 A | 5/2000 | Smith et al. | |
| 6,157,721 A | 12/2000 | Shear et al. | |
| 6,170,744 B1 * | 1/2001 | Lee et al. | 235/380 |
| 6,182,214 B1 * | 1/2001 | Hardjono | 713/163 |
| 6,189,098 B1 | 2/2001 | Kaliski, Jr. | |
| 6,195,433 B1 * | 2/2001 | Vanstone et al. | 380/285 |
| 6,212,553 B1 | 4/2001 | Lee et al. | |
| 6,212,636 B1 | 4/2001 | Boyle et al. | |
| 6,223,291 B1 | 4/2001 | Puhl et al. | |
| 6,233,683 B1 | 5/2001 | Chan et al. | |
| 6,289,382 B1 | 9/2001 | Bowman-Amuah | |
| 6,324,650 B1 | 11/2001 | Ogilvie | |
| 6,345,256 B1 | 2/2002 | Milsted et al. | |
| 6,367,012 B1 | 4/2002 | Atkinson et al. | |
| 6,374,357 B1 | 4/2002 | Mohammed et al. | |
| 6,390,374 B1 | 5/2002 | Carper et al. | |
| 6,434,601 B1 | 8/2002 | Rollins | |
| 6,453,416 B1 | 9/2002 | Epstein | |
| 6,470,450 B1 | 10/2002 | Langford et al. | |
| 6,574,609 B1 | 6/2003 | Downs et al. | |
| 6,584,376 B1 | 6/2003 | Van Kommer | |
| 6,587,837 B1 | 7/2003 | Spagna et al. | |
| 6,697,948 B1 | 2/2004 | Rabin et al. | |
| 6,748,541 B1 | 6/2004 | Margalit et al. | |
| 6,760,752 B1 | 7/2004 | Liu et al. | |
| 6,766,353 B1 | 7/2004 | Lin et al. | |
| 6,795,919 B1 | 9/2004 | Gibbs et al. | |
| 6,795,923 B1 | 9/2004 | Stern et al. | |
| 6,807,277 B1 | 10/2004 | Doonan et al. | |
| 6,834,277 B1 | 12/2004 | Learmonth | |
| 6,980,962 B1 | 12/2005 | Arganbright et al. | |
| 6,990,578 B1 | 1/2006 | O'Brien et al. | |
| 7,046,991 B2 | 5/2006 | Little et al. | |
| 7,051,200 B1 | 5/2006 | Manferdelli et al. | |
| 7,082,536 B2 | 7/2006 | Filipi-Martin et al. | |
| 7,243,236 B1 * | 7/2007 | Sibert | 713/179 |
| 7,299,412 B1 | 11/2007 | Hull et al. | |
| 7,546,956 B2 | 6/2009 | Adams et al. | |
| 7,716,139 B2 | 5/2010 | Brown et al. | |
| 7,797,545 B2 | 9/2010 | Adams et al. | |
| 2001/0014156 A1 | 8/2001 | Murakami | |
| 2001/0044901 A1 | 11/2001 | Grawrock | |
| 2002/0025046 A1 | 2/2002 | Lin | |
| 2002/0026574 A1 | 2/2002 | Watanabe et al. | |
| 2002/0087479 A1 | 7/2002 | Malcolm | |
| 2002/0095568 A1 | 7/2002 | Norris et al. | |
| 2002/0112078 A1 | 8/2002 | Yach | |
| 2002/0112162 A1 | 8/2002 | Cocotis et al. | |
| 2002/0128036 A1 | 9/2002 | Yach et al. | |
| 2003/0026231 A1 | 2/2003 | Lazaridis et al. | |
| 2003/0046593 A1 * | 3/2003 | Xie et al. | 713/202 |
| 2003/0055737 A1 * | 3/2003 | Pope et al. | 705/26 |
| 2003/0061087 A1 | 3/2003 | Srimuang | |
| 2003/0101359 A1 | 5/2003 | Aschen et al. | |
| 2003/0105589 A1 | 6/2003 | Liu et al. | |
| 2003/0147536 A1 | 8/2003 | Andivahis et al. | |
| 2003/0159029 A1 | 8/2003 | Brown et al. | |
| 2003/0204741 A1 | 10/2003 | Schoen et al. | |
| 2004/0025022 A1 | 2/2004 | Yach et al. | |
| 2004/0078334 A1 | 4/2004 | Malcolm et al. | |
| 2004/0083366 A1 * | 4/2004 | Nachenberg et al. | 713/170 |
| 2004/0133775 A1 | 7/2004 | Callas et al. | |
| 2004/0139163 A1 | 7/2004 | Adams et al. | |
| 2004/0148356 A1 | 7/2004 | Bishop et al. | |
| 2004/0153560 A1 | 8/2004 | Masuhiro et al. | |
| 2004/0158714 A1 | 8/2004 | Peyravian et al. | |
| 2004/0166834 A1 | 8/2004 | Omar et al. | |
| 2004/0170155 A1 | 9/2004 | Omar et al. | |
| 2004/0171369 A1 | 9/2004 | Little et al. | |
| 2004/0171374 A1 | 9/2004 | Little et al. | |
| 2004/0199665 A1 | 10/2004 | Omar et al. | |
| 2004/0202327 A1 | 10/2004 | Little et al. | |
| 2004/0205330 A1 | 10/2004 | Godfrey et al. | |
| 2004/0249817 A1 | 12/2004 | Liu et al. | |
| 2005/0009502 A1 | 1/2005 | Little et al. | |
| 2005/0038991 A1 | 2/2005 | Brown et al. | |
| 2005/0065753 A1 * | 3/2005 | Bigus et al. | 702/186 |
| 2005/0071631 A1 | 3/2005 | Langer | |
| 2005/0071636 A1 | 3/2005 | Lee et al. | |
| 2005/0086477 A1 | 4/2005 | Lin et al. | |
| 2005/0190912 A1 * | 9/2005 | Hopkins et al. | 380/44 |
| 2005/0289072 A1 | 12/2005 | Sabharwal | |
| 2006/0031309 A1 | 2/2006 | Luoffo et al. | |
| 2006/0031315 A1 | 2/2006 | Fenton et al. | |
| 2006/0168012 A1 | 7/2006 | Rose et al. | |
| 2007/0005706 A1 | 1/2007 | Branda et al. | |
| 2007/0014399 A1 * | 1/2007 | Scheidt et al. | 380/44 |
| 2007/0038704 A1 | 2/2007 | Brown et al. | |
| 2007/0074031 A1 | 3/2007 | Adams et al. | |
| 2007/0074032 A1 | 3/2007 | Adams et al. | |
| 2007/0074033 A1 | 3/2007 | Adams et al. | |
| 2007/0113101 A1 | 5/2007 | LaVasseur et al. | |
| 2007/0260876 A1 | 11/2007 | Brown et al. | |
| 2008/0294726 A1 | 11/2008 | Sidman | |
| 2010/0211795 A1 | 8/2010 | Brown et al. | |
| 2010/0332848 A1 | 12/2010 | Adams et al. | |
| 2012/0179917 A1 | 7/2012 | Yach | |

FOREIGN PATENT DOCUMENTS

| | | |
|---|---|---|
| AU | 2005225093 | 9/2008 |
| CA | 2526863 | 4/2006 |
| CA | 2561610 | 3/2007 |
| CN | 1541350 | 10/2004 |
| CN | 1767438 | 5/2006 |
| CN | 100507934 | 7/2009 |
| CN | 100573402 | 12/2009 |
| CN | 101694687 | 4/2010 |
| CN | 101694688 | 4/2010 |
| CN | 101714201 | 5/2011 |
| EP | 0930793 | 7/1999 |
| EP | 1 077 554 A | 2/2001 |
| EP | 1318488 A3 | 11/2003 |
| EP | 1536601 | 6/2005 |
| EP | 1320795 | 11/2005 |
| EP | 1626324 | 2/2006 |
| EP | 1653655 | 5/2006 |
| EP | 1653655 | 11/2006 |
| EP | 1770899 | 1/2009 |
| EP | 1770589 | 9/2009 |
| EP | 2107490 | 10/2009 |
| EP | 1626325 | 9/2010 |
| EP | 1626326 | 9/2010 |
| EP | 2278429 | 1/2011 |
| EP | 2284644 | 2/2011 |
| EP | 2306259 | 4/2011 |
| EP | 2306260 | 4/2011 |
| FR | 2872309 A1 | 12/2005 |
| HK | 1055629 | 5/2006 |
| HK | 1091666 | 1/2007 |
| HK | 1091665 | 11/2010 |
| HK | 1091667 | 11/2010 |
| JP | 10-79025 | 5/1989 |
| JP | 9-205424 | 8/1997 |
| JP | 2000-10477 | 1/2000 |
| JP | 2000-312204 | 11/2000 |
| JP | 2002-189976 | 7/2002 |
| JP | 2003-162508 | 6/2003 |
| JP | 2004-015257 | 1/2004 |
| JP | 2004-247799 | 9/2004 |
| JP | 2006129490 | 5/2006 |
| SG | 131063 | 4/2007 |
| SG | 151321 | 4/2009 |
| TW | 00505905 | 10/2002 |
| TW | 1324871 | 5/2010 |
| WO | 99/08429 | 2/1999 |
| WO | 9905600 | 2/1999 |
| WO | 9959286 A1 | 11/1999 |
| WO | 0077748 A1 | 12/2000 |
| WO | 0113574 A1 | 2/2001 |
| WO | 0198983 A | 12/2001 |
| WO | 02/21464 | 3/2002 |
| WO | WO 02/25409 A2 | 3/2002 |
| WO | 02/37245 | 5/2002 |
| WO | 03/063413 | 7/2003 |
| WO | 2005015867 | 2/2005 |
| WO | 2005029292 A | 3/2005 |

| | | |
|---|---|---|
| WO | 2005081489 A | 9/2005 |
| WO | 2005107133 | 11/2005 |
| WO | 2006/000531 | 1/2006 |

OTHER PUBLICATIONS

Anonymous "Web Page of Verisign" Internet Article, 'Online! Mar. 8, 2005, XP002367140 URL:http://web.archive.org/web/20050308164449/www.verisign.com/products-services/code-signing/symbian-content-signing/index.html.

Zhengmin, Duan, Identity Authentication Technique Research and Implementation:, dated Oct. 20, 2004, disclosed Jun. 7, 2005 (English translation).

European Search Report. Application No. 05109033.0 2415 Date: Mar. 15, 2006.

Gutman, Peter "Chapter 6: Random Number Generation" Online! 2004 XP 002370066 URL: http://web.archive.org/web/20041013173837/http://www.cypherpunks.to/{peter/06_random.pdf.

Aladdin Knowledge Systems Ltd "eToken Reference Guide" Online! Aug. 2003, XP002370067 URL: http://etoken.mikrobeta.com.tr/PDF/etoken_enterprise_Reference_3_50_Guide.pdf.

Perrin, Michael et al. "Usability Testing of System Status Displays for Army Missile Defense" CHI 97 Electronic Publications: Late-Breaking/Interactive Posters, Online! 1997, XP002370068 URL: http://www.sigch1.org/ch197/proceedings/poster/mp.htm.

Co-pending U.S. Appl. No. 11/237,727, "System and Method for Registering Entities for Code Signing Services", Filed Sep. 29, 2005.

Co-pending U.S. Appl. No. 11/237,726, "Account Management in a System and Method for Providing Code Signing Services", Filed Sep. 29, 2005.

Co-pending U.S. Appl. No. 11/237,725, "Remote Hash Generation in a System and Method for Providing Code Signing Services", Filed Sep. 29, 2005.

Co-pending U.S. Appl. No. 11/237,724, "System and Method for Providing Code Signing Services", filed Sep. 29, 2005.

Http://www.blackberry.com/developers/pdfs/JDE%20API%20key%20Order%20Form.pdf Code Signing Registration.

http://www.ietf.org/rfc.rfc2617.text Digest Auth RFC RIM Confidential and/or Solicitor-Client Privileged Work Product 1999.

Certipost E-Trust General Terms and Conditions for an E-Trust Code Signing Certificate Jan. 2004.

European Communication under Rule 51(4) EPC. Application No. 05109033.0. Date: Sep. 28, 2007.

United States Final Office Action. Co-pending U.S. Appl. No. 11/237,725. Dated: Jul. 21, 2009.

Amendment. Co-pending U.S. Appl. No. 11/237,725. Dated: Mar. 23, 2009.

United States Office Action. Co-pending U.S. Appl. No. 11/237,725. Dated: Dec. 23, 2008.

Request for Continued Examination (RCE). Co-pending U.S. Appl. No. 11/237,726. Dated: Jul. 24, 2009.

Notice of Allowance. Co-pending U.S. Appl. No. 11/237,726. Dated: Jun. 2, 2009.

Amendment. Co-pending U.S. Appl. No. 11/237,726. Dated: Feb. 6, 2009.

United States Office Action. Co-pending U.S. Appl. No. 11/237,726. Dated: Dec. 23, 2008.

United States Office Action. Co-pending U.S. Appl. No. 11/237,727. Dated: Jun. 26, 2009.

Amendment. Co-pending U.S. Appl. No. 11/237,727. Dated: Sep. 28, 2009.

United States Final Office Action. Co-pending U.S. Appl. No. 11/237,724. Dated: Jul. 20, 2009.

Amendment. Co-pending U.S. Appl. No. 11/237,724. Dated: Mar. 24, 2009.

United States Office Action. Co-pending U.S. Appl. No. 11/237,724. Dated: Dec. 30, 2008.

Co-pending U.S. Appl. No. 10/381,219, "Software Code Signing System and Method", Filed Mar. 20, 2003.

United States Office Action. Co-pending U.S. Appl. No. 10/381,219. Dated: Mar. 17, 2009.

Responsive Amendment. Co-pending U.S. Appl. No. 10/381,219. Dated: Jun. 15, 2009.

Amendment. Co-pending U.S. Appl. No. 11/237,725. Dated: Sep. 28, 2009.

Amendment. Co-pending U.S. Appl. No. 11/237,724. Dated: Sep. 28, 2009.

United States Office Action. Co-pending U.S. Appl. No. 11/237,726. Dated: Oct. 7, 2009.

United States Office Action. Co-pending U.S. Appl. No. 11/237,725. Dated: Dec. 4, 2009.

Request for Continued Examination (RCE). Co-pending U.S. Appl. No. 11/237,725. Dated: Sep. 28, 2009.

United States Office Action. Co-pending U.S. Appl. No. 11/237,724. Dated: Dec. 7, 2009.

Request for Continued Examination (RCE). Co-pending U.S. Appl. No. 11/237,724. Dated: Sep. 28, 2009.

Amendment. Co-pending U.S. Appl. No. 11/237,727. Dated: Apr. 12, 2010.

United States Office Action. Co-pending U.S. Appl. No. 11/237,727. Dated: Jan. 12, 2010.

Final Office Action. Co-pending U.S. Appl. No. 10/381,219. Dated: Oct. 29, 2009.

Amendment After Final. Co-pending U.S. Appl. No. 10/381,219. Dated: Mar. 22, 2010.

Request for Continued Examination (RCE). Co-pending U.S. Appl. No. 10/381,219. Mar. 30, 2010.

ISO/IEC FCD 7816-9 "Identification cards . . . ", Part 9: Additional interindustry commands and security attibutes, Jun. 17, 1999, S. 8 bis 13, 29 bis 31 (D5), 12 pages.

ISO/IEC FDIS 7816-8 "Identification cards . . .", Part 8: Security related interindustry commands, Jun. 25, 1998, S. 2, 3, 6 bis 13 (D6), 13 pages.

ISO/IEC 7816-4 "Information Technology—Identification Cards . . . ", Part 4: Interindustry Commands for Interchange, 1995, S. 12 bis 16 (D7), 6 pages.

Handbuch der Chipkarten, W. Rankl/W. Effing, 3. Auflage Hanser-Verlag Munchen, 1999, S. 197 bis 203, 261 bis 272, 740, 795 bis 797 (D8), 18 pages.

Interview Summary. Co-pending U.S. Appl. No. 11/237,727. Dated: Apr. 27, 2010.

Notice of Allowance. Co-pending U.S. Appl. No. 11/237,727. Dated: May 14, 2010.

Notice of Abandonment. Co-pending U.S. Appl. No. 11/237,726. Dated: Apr. 30, 2010.

Office Action. Co-pending U.S. Appl. No. 10/381,219. Dated: Sep. 2, 2010.

Notice of Abandonment. Co-pending U.S. Appl. No. 11/237,725. Dated: Sep. 14, 2010.

Notice of Abandonment. Co-pending U.S. Appl. No. 11/237,724. Dated: Sep. 22, 2010.

Amendment/Response. Co-pending U.S. Appl. No. 10/381,219. Dated: Feb. 3, 2011.

Final Office Action. Co-pending U.S. Appl. No. 10/381,219. Dated: May 13, 2011.

Notice of Allowance. Canadian Patent Application No. 2,561,610. Dated: Feb. 14, 2011.

Amendment After Allowance CIPO Acknowledgement. Canadian Patent Application No. 2,561,610. Dated: Aug. 11, 2011.

Rankl, Wolfgang, et al. Handbuch der Chipkarten, Aufbau—Funktionsweise—Einsatz von Smart Cards, Hanser, 1999—in German.

Co-pending U.S. Appl. No. 12/874,325, "System and Method for Code Signing", Filed Sep. 2, 2010.

Office Action. Co-pending U.S. Appl. No. 12/874,325. Dated: Sep. 22, 2011.

Response with Terminal Disclaimer. Co-pending U.S. Appl. No. 12/874,325. Dated: Dec. 22, 2011.

Response with Extension of Time and RCE Co-pending U.S. Appl. No. 10/381,219. Dated: Nov. 21, 2011.

Stallings, W., "Cryptography & Network Security: Principles & Practice-2nd" 1998, pp. 163-205.

Pugh, William et al., "Incremental Computation via Function Caching", Conference Record of the Sixteenth Annual ACM Symposium on Principles of Programming Languages ACM New York, NY, U.S.A., Jan. 11, 1989, pp. 315-328.

Walsh, Kevin et al., "Staged Simulation: A General Technique for Improving Simulation Scale and Performance", ACM Transactions on Modeling and Computer Simulation vol. 14, No. 2, Apr. 2004, pp. 170-195.

Installing Certificates with Upcerins, http://developer.openwave.com/htmldoc/41/tools/nottools5.html, Chapter 2, pp. 1-6.

Requesting Certificates with CertMaker, http://developer.openwave.com/htmldoc/41/tools/nottools2.html, Chapter 2, pp. 1-4.

WebMail Basics, Academic Computing Support, May 2003, pp. 1-8.

Co-pending U.S. Appl. No. 10/975,988, "System and Method for Verifying Digital Signatures on Certificates", filed Oct. 29, 2004.

Office Action. Co-pending U.S. Appl. No. 10/975,988. Dated: Mar. 14, 2008.

Response. Co-pending U.S. Appl. No. 10/975,988. Dated: Jul. 14, 2008.

Final Office Action. Co-pending U.S. Appl. No. 10/975,988. Dated: Oct. 10, 2008.

Response. Co-pending U.S. Appl. No. 10/975,988. Dated: Dec. 10, 2008.

Advisory Action. Co-pending U.S. Appl. No. 10/975,988. Dated: Dec. 31, 2008.

Request for Continued Examination. Co-pending U.S. Appl. No. 10/975,988. Dated: Jan. 9, 2009.

Office Action. Co-pending U.S. Appl. No. 10/975,988. Dated: Feburary 9, 2009.

Response. Co-pending U.S. Appl. No. 10/975,988. Dated: May 5, 2009.

Final Office Action. Co-pending U.S. Appl. No. 10/975,988. Dated: Aug. 10, 2009.

Response with RCE. Co-pending U.S. Appl. No. 10/975,988. Dated: Nov. 10, 2009.

Notice of Allowance. Co-pending U.S. Appl. No. 10/975,988. Dated: Dec. 22, 2009.

Co-pending U.S. Appl. No. 12/771,194, "System and Method for Verifying Digital Signatures on Certificates", Filed Apr. 30, 2010.

Response. European Patent Application No. 05109033.0. Dated: Dec. 1, 2006.

Decision to grant a European patent pursuant to Article 97(1) EPC. European Patent Application No. 05109033.0. Dated: Dec. 11, 2008.

Office Action. Canadian Patent Application No. 2,561,610. Dated: Oct. 1, 2009.

Final Office Action. Co-pending U.S. Appl. No. 12/874,325. Dated: Feb. 24, 2012.

Amendment After Final. Co-pending U.S. Appl. No. 12/874,325. Dated: Apr. 24, 2012.

Advisory Action. Co-pending U.S. Appl. No. 12/874,325. Dated May 2, 2012.

Request for Continued Examination (RCE) and amendment. Co-pending U.S. Appl. No. 12/874,325. Dated: Jul. 24, 2012.

Office Action. Co-pending U.S. Appl. No. 13/413,173. Dated: May 11, 2012.

Co-pending U.S. Appl. No. 13/413,173, "Code Signing System and Method", Filed Mar. 6, 2012.

Office Action. Co-pending U.S. Appl. No. 12/771,194. Dated: Feb. 3, 2012.

Amendment. Co-pending U.S. Appl. No. 12/771,194. Dated: Apr. 12, 2012.

Final Office Action. Co-pending U.S. Appl. No. 12/771,194. Dated: May 22, 2012.

Heath, Craig, "Symbian OS Platform Security: Software Development Using the Symbian OS Security Architecture", John Wiley & Sons, Feb. 2006, Chapter 9.

Premkumar T. Devanbu, Philip W-L Fong, Stuart G. Stubblebine, "Techniques for trusted software engineering", Proceedings of the 20th international conference on Software engineering, p. 126-135, Apr. 19-25, 1998, Kyoto, Japan.

ISO/IEC 7816-4 Part 4: "Interindustry commands for interchange" XP002269400. May 2, 2004.

Interview Summary. Co-pending U.S. Appl. No. 13/413,173. Dated: Aug. 16, 2012.

Response. Co-pending U.S. Appl. No. 13/413,173. Dated: Aug. 13, 2012.

Interview Summary. Co-pending U.S. Appl. No. 13/413,173. Dated: Aug. 3, 2012.

Request for Continued Examination (RCE). Co-pending U.S. Appl. No. 12/771,194. Dated: Aug. 14, 2012.

Amendment. Co-pending U.S. Appl. No. 12/771,194. Dated: Aug. 14, 2012.

* cited by examiner

NAME: INTERNAL SIGNER

ID: RIS

PUBLIC KEY:
822A2AAB D521CDCC CAB86146 A924A643 8AABD654 C8891979
DD6AF1B3 D0811CDA 676841FC 6ADEB5D9 B745144F E32E499A
02A74536 1891D929 96CB988F B8419EC6 6F4F2585 CB3EE010
4E67F477 F2D028A5 7BB3AEE8 D21C1E23 6F65E1E3 6723A6EC

SIGNATURE ALGORITHM PARAMETERS: RSA 1024

[CLOSE] [EMAIL] [CHANGE PASSWORD]

FIG. 8C

ADD RECORD

CLIENT ID: 1914414899

CLIENT INFO: NEIL ADAMS

CLIENT PIN: <AUTO GENERATE>

OF REQUESTS: 100   ☐ INFINITE

EXPIRY DATE: 16/01/2005   ☐ NEVER

EMAIL NOTIFICATIONS ON:

☑ ERROR  ☑ REGISTER  ☑ SIGN  ☑ IRREGULAR BEHAVIOR

NOTIFY E-MAIL TO: nadams@rim.com

NOTIFY E-MAIL BCC:

☑ EMAIL CSI FILE

E-MAIL TO: nadams@rim.com

BCC TO:

[ SAVE ]   [ CANCEL ]

FIG. 10

SYSTEM AND METHOD FOR PROVIDING AN INDICATION OF RANDOMNESS QUALITY OF RANDOM NUMBER DATA GENERATED BY A RANDOM DATA SERVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the systems and methods described herein relate generally to the field of security protocols for software applications, and more specifically, in one embodiment, to a system and method for providing code signing services to individuals or entities that wish to have software applications digitally signed in order that the applications may be executed on a computing device (e.g. a mobile device).

BACKGROUND OF THE INVENTION

Security protocols involving software code signing schemes are typically used to ensure the reliability of software applications that are downloaded from the Internet or other sources for execution on a computing device. The computing device may be, for example, a mobile device.

A code signing system may be implemented on a computing device to control access to certain resources on the computing device by a software application. In one example system, there is provided on the computing device an application platform, one or more application programming interfaces (APIs), and a virtual machine. The APIs are configured to link software applications with the application platform, and more specifically, to allow software applications to make function calls to or otherwise interact with resources made generally accessible to software applications on the computing device.

However, some of the APIs may be classified as "sensitive" by entities that wish to restrict access to those APIs or to the particular resources associated with those APIs. In the example system, the virtual machine is adapted to verify the authenticity of a digital signature appended to an application requiring access to a sensitive API before access to the sensitive API is granted. Accordingly, in order for an application to be granted access to the sensitive API, an appropriate signing authority must first digitally sign the application.

BRIEF DESCRIPTION OF THE DRAWINGS

For a better understanding of the embodiments of the systems and methods described herein, and to show more clearly how they may be carried into effect, reference will now be made, by way of example, to the accompanying drawings in which:

FIGS. 8B and 8C are example dialog boxes in a user interface provided by a code signing authority application;

FIG. 10 is an example form illustrating details of an account record.

DETAILED DESCRIPTION

Figure 1:
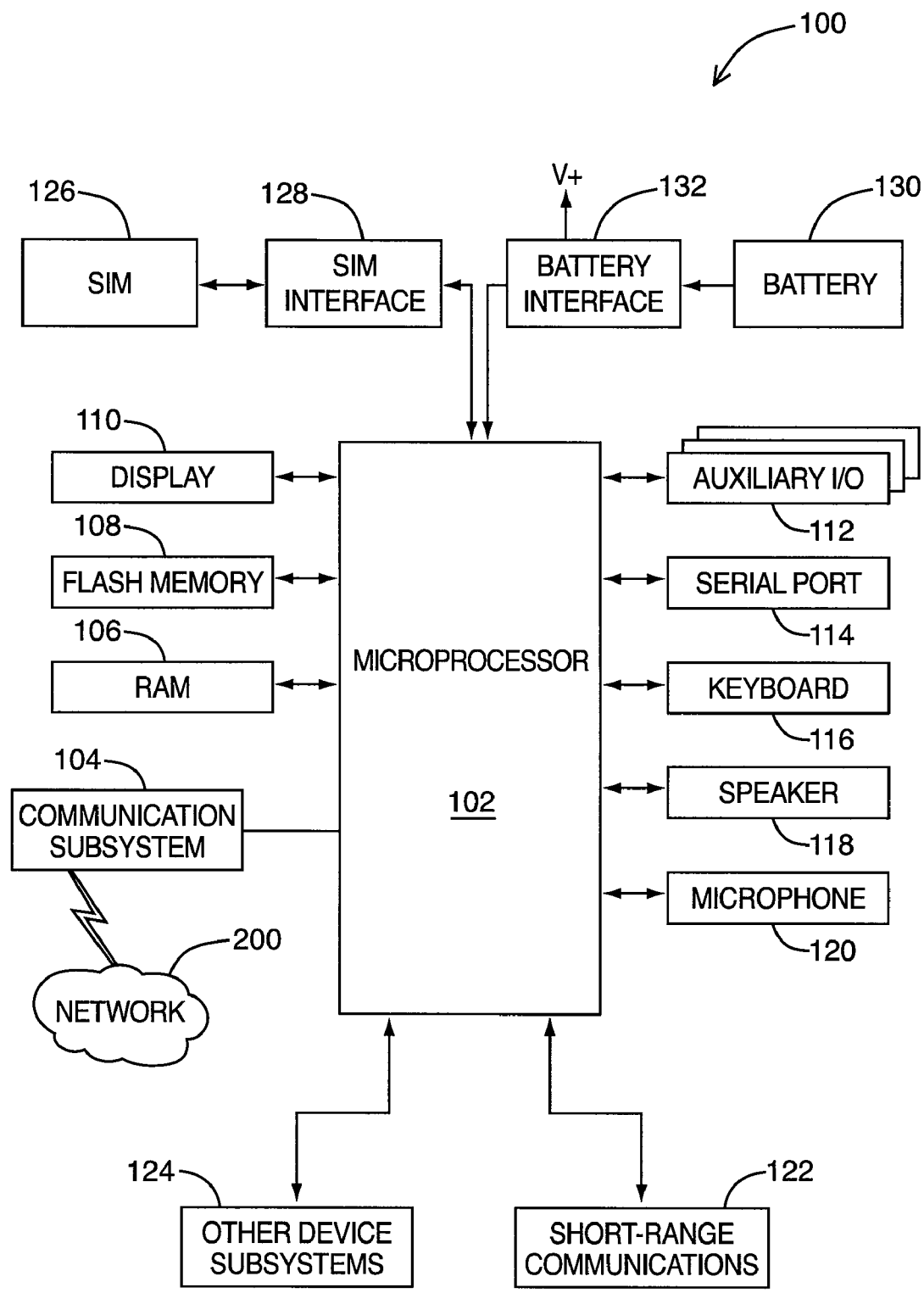
FIG. 1 is a block diagram of a mobile device in one example implementation.

Software application developers who create applications that would require access to sensitive APIs on a computing device may need to have their applications digitally signed by an appropriate signing authority, so that the applications will properly execute on the computing device. An entity that wishes to restrict access to certain sensitive APIs (and associated resources), such as proprietary APIs that the entity itself may have authored for example, may wish to act as a signing authority in respect of those APIs and provide code signing services to the software application developers requiring access to those APIs. Through the provision of code signing services, an entity can control who should and should not be granted access to specific APIs that it has authored and/or classified as sensitive, track who has requested such access, and charge for providing such access if desired, for example.

At least one embodiment described herein relates generally to a system and method for providing code signing services to software application developers or to other individuals or entities that wish to have applications digitally signed. Signing of the applications may be required in order to enable the applications to access sensitive APIs and associated resources of a computing device when the applications are executed on the computing device.

In one embodiment, keys are created and used to sign applications. For example, a signing authority may create a public key and a private key. The private key may be used by the signing authority to digitally sign applications. The strength of the signing process implemented by the signing authority depends on the quality of the key pair created. In particular, the more random the key, the stronger the key is. If the key contains less random data, it may be easier for an attacker to figure out what the key is.

When random number data is being generated by a random data service, such as that which may be employed when generating key pairs for use in code signing, a means for representing the quality of the randomness to a user in an intuitive way can be desirable.

In one broad aspect, there is provided a method for providing an indication of randomness quality of random number data generated by a random data service, the method comprising the steps of: retrieving random number data from the random data service; applying one or more randomness tests to the retrieved random number data to compute at least one indicator of the randomness quality of the random number data; associating the at least one indicator with at least one state represented by a color; and displaying the color associated with the at least one indicator to a user.

In accordance with another broad aspect, the displaying step comprises displaying the color associated with the at least one indicator in a traffic light icon.

In another broad aspect, the random data service provides random number data to one or more applications adapted to generate key pairs, each key pair comprising a public and private key, which may be used in code signing applications, for example.

By way of example, these and other related aspects will be described with reference to systems and methods for providing code signing services. However, it would be understood by persons skilled in the art, that the features of these aspects may be employed in different applications, in variant embodiments.

The computing device upon which signed applications are executed may be a mobile station, for example. However, it will be understood by persons skilled in the art that at least some of the embodiments described herein may be implemented in respect of applications that are to be executed on computing devices other than mobile stations.

A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations. To aid the reader in understanding the structure of a mobile device and how it communicates with other devices, reference is made first to FIGS. 1 through 3.

Referring to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that other suitable standards that are developed in the future may be used. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or operator of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some parameters such as an International Mobile Subscriber Identity (IMSI). An advantage of using SIM 126 is that a subscriber is not necessarily bound by any single physical mobile device. SIM 126 may store additional subscriber information for a mobile device as well, including date book (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Figure 2:
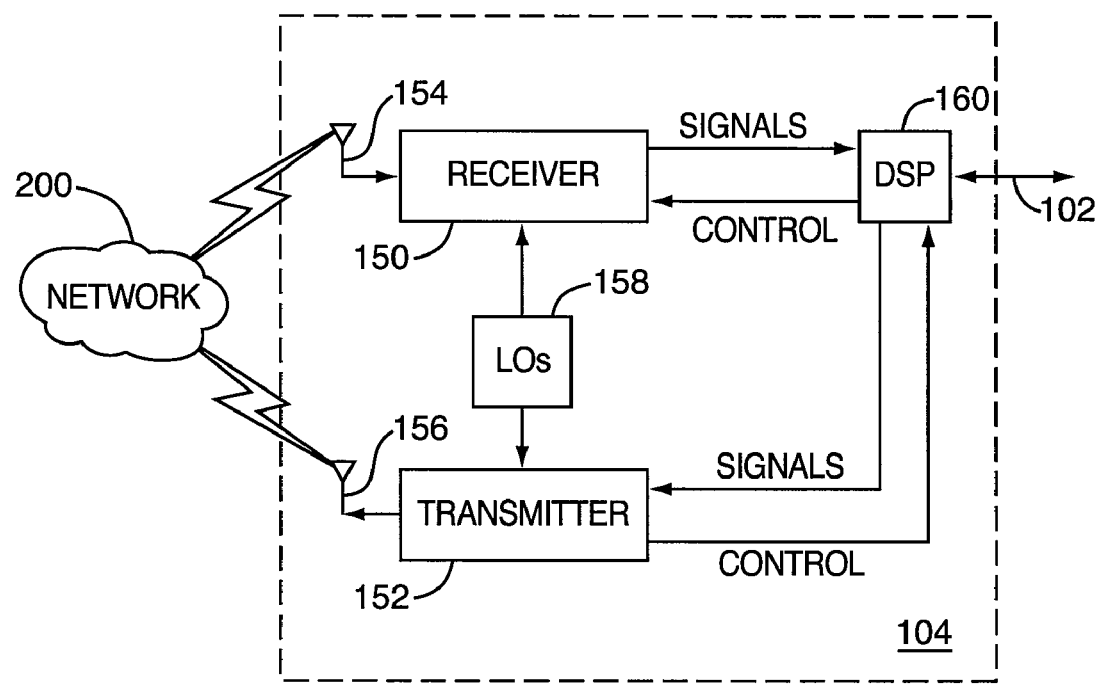
FIG. 2 is a block diagram of a communication subsystem component of the mobile device of FIG. 1.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Figure 3:
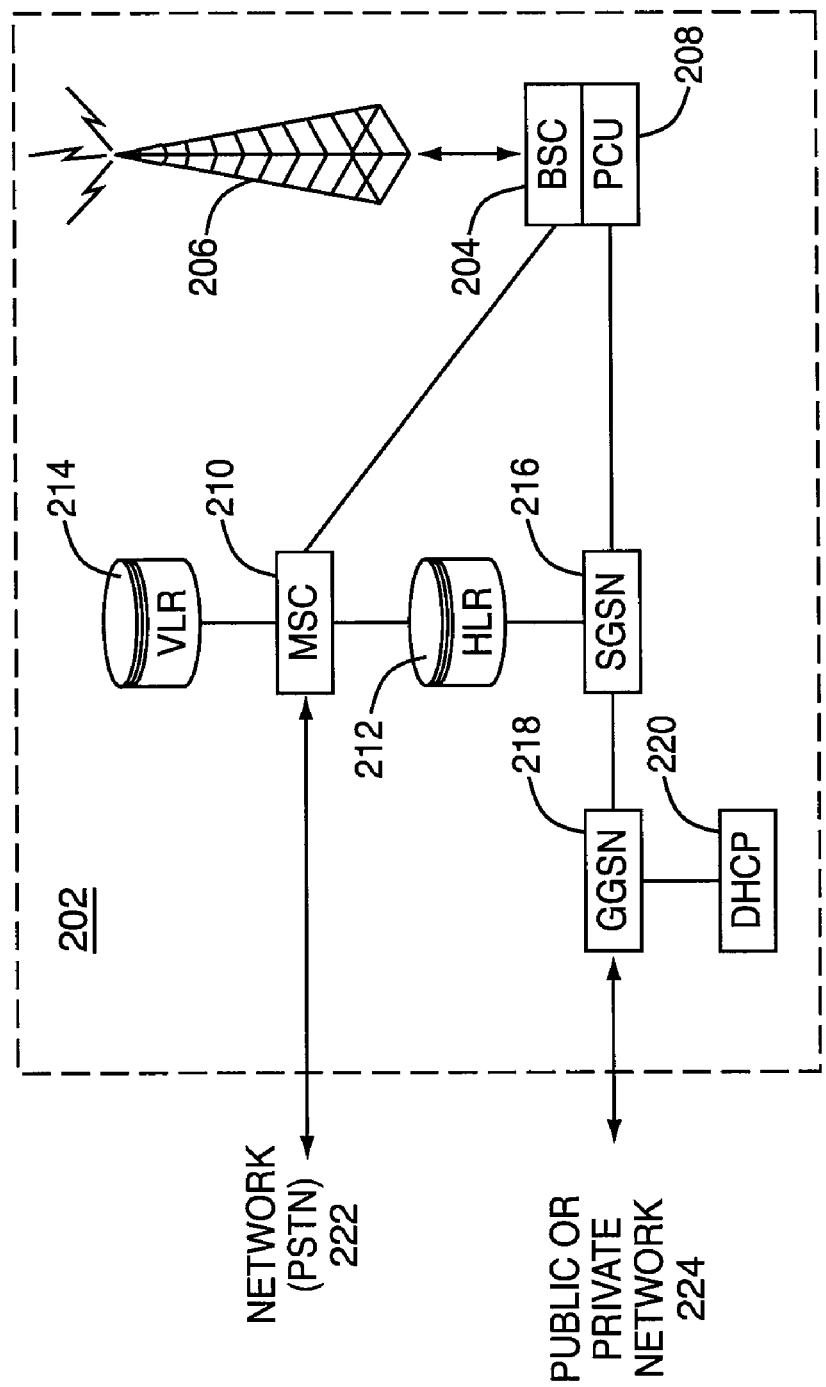
FIG. 3 is a block diagram of a node of a wireless network.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as an operator profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

In order to better understand the various embodiments of the systems and methods described in this specification relating to the provision of code signing services, an example code signing protocol and features of an example code signing system from the perspective of a mobile device will first be discussed, with reference to FIGS. 4 through 6. As noted earlier, while many of the following examples are described generally with reference to mobile devices, embodiments described herein may be applicable to devices other than mobile devices.

Figure 4:
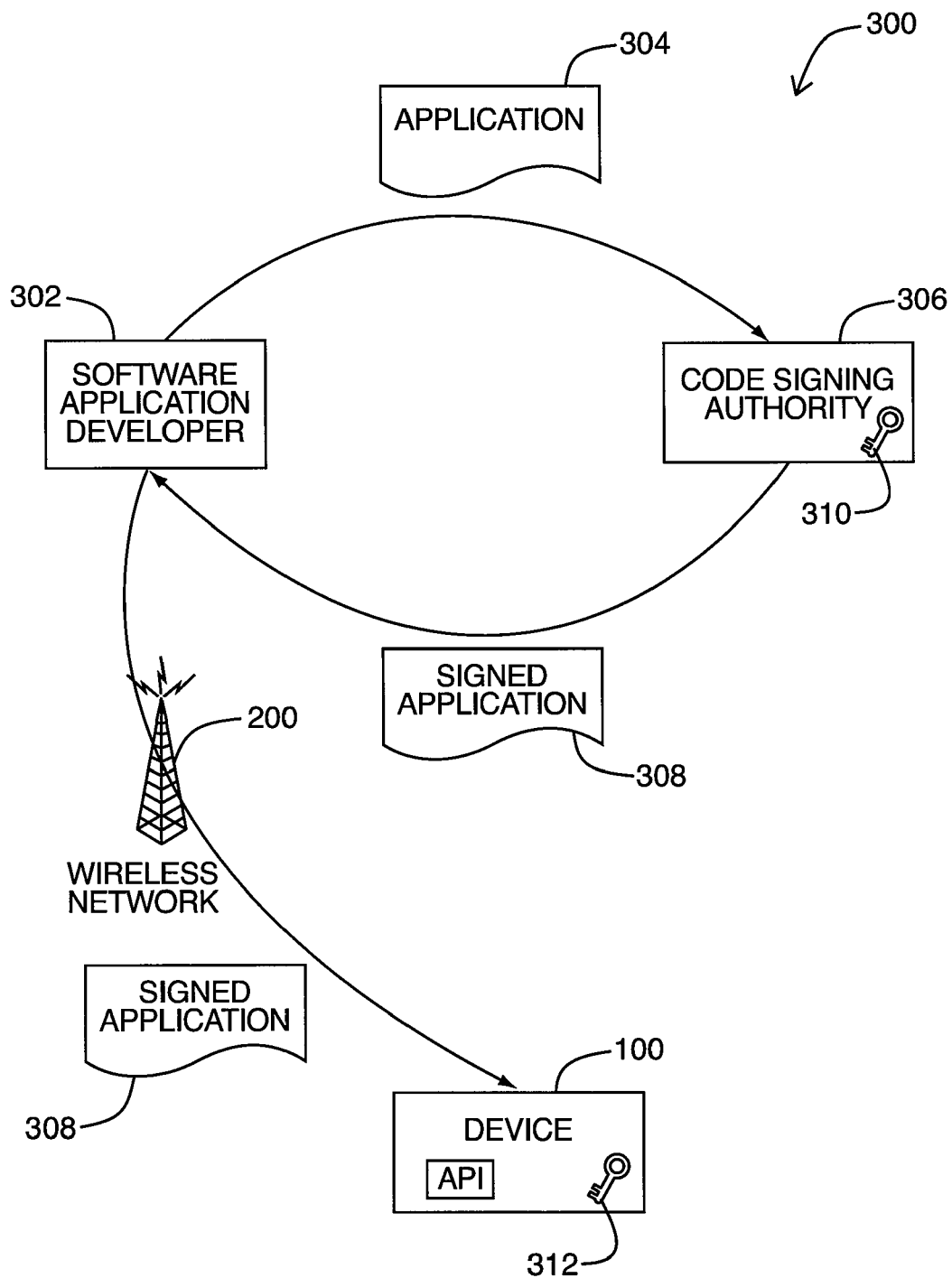
FIG. 4 is a diagram illustrating an example code signing protocol in which a code signing authority provides code signing services to a software application developer.

Referring to FIG. 4, a diagram illustrating an example code signing protocol in which a code signing authority provides code signing services to a software application developer is shown generally as 300.

A software application developer 302 creates a software application 304 for mobile device 100 that requires access to one or more sensitive APIs on mobile device 100. It will be understood that software applications comprise software code that may ultimately be executed on a mobile device or other computing device. Consequently, the terms "code signing" and "application signing" may be used interchangeably herein.

Software application 304 may, for example, be a Java application that operates on a Java virtual machine (JVM) installed on mobile device 100. An API enables software applications to interface with an application platform on a mobile device or other computing device. The application platform may include, for example, resources such as the device hardware, operating system and core software and data models. Accordingly, in order to make function calls to or otherwise interact with such device resources, software application 304 will typically need to access one or more APIs on mobile device 100. The APIs effectively "bridge" software application 304 and device resources.

In this description and the appended claims, references to API access should be interpreted to include access of an API in such a way as to allow a software application to interact with one or more corresponding device resources. Therefore, providing access to any API allows a software application to interact with associated device resources, whereas denying access to an API prevents the software application from interacting with the associated resources. For example, a database API may communicate with a device file or data storage system, and access to the database API would provide for interaction between a software application and the file or data storage system. A user interface (UI) API would communicate with controllers and/or control software for such device components as a screen, a keyboard, and any other device components that provide output to an operator or accept input from an operator of the mobile device. In a mobile device, a radio API may also be provided as an interface to wireless communication resources, such as a transmitter and receiver, for example. A cryptographic API may be provided to interact with a cryptographic module, which implements cryptographic algorithms on a device. These are merely illustrative examples of APIs that may be provided on a mobile device and potentially on other computing devices. Any of such devices may include some or all of these example APIs, or different APIs instead of or in addition to those described above.

In general, any given API may be classified as sensitive by a mobile device manufacturer, or possibly by an API author, a wireless network operator, a device owner or operator, or some other entity that, for example, might be affected by a virus or malicious code in a software application for the device. For instance, a mobile device manufacturer may classify as sensitive those APIs that interface with cryptographic routines, wireless communication functions, or proprietary data models such as address book or calendar entries. To protect against unauthorized access to these sensitive APIs, software application developer 302 is required to obtain one or more digital signatures from the mobile device manufacturer or other entity that classified the APIs as sensitive, or from a code signing authority 306 acting on behalf of the manufacturer or other entity with an interest in protecting access to sensitive device APIs, and append the signature(s) to software application 304 as described in further detail below.

A digital signature may be obtained for each sensitive API or library that includes a sensitive API to which software application 304 requires access. In certain implementations, multiple signatures are desirable. This would allow a service provider, company or network operator to restrict some or all software applications loaded or updated onto a particular set of mobile devices, for example. In one multiple-signature scenario, all APIs on a device are restricted and locked until a "global" signature is verified for a software application. For example, a company may wish to prevent its employees from executing any software applications onto their devices until permission is first obtained from a corporate information technology (IT) or computer services department. All such corporate mobile devices may then be configured to require verification of at least a global signature before a software application can be executed. Access to sensitive device APIs and libraries, if any, could then be further restricted, to be dependent upon verification of respective corresponding digital signatures.

The binary executable representation of software application 304 may be independent of the particular type of mobile device or model of a mobile device. Software application 304 may, for example, be in a write-once-run-anywhere binary format, such as is typically the case with Java software applications. However, it may be desirable to have a digital signature for each mobile device type or model, or alternatively for each mobile device platform or manufacturer, for example. Therefore, software application 304 may need to be submitted to several code signing authorities if software application 304 targets several types or models of mobile devices.

In the example shown in FIG. 4, when software application developer 302 requires software application 304 to be signed, software application 304 is sent from application developer 302 to code signing authority 306. Code signing authority 306 may represent the mobile device manufacturer, the authors of any sensitive APIs, or possibly others that have knowledge of the operation of the sensitive APIs to which software application 304 needs access.

While not explicitly shown in FIG. 4, in certain situations, it will be understood that a software application may be submitted to more than one code signing authority. Each code signing authority may, for example, be responsible for signing software applications for particular sensitive APIs, or APIs on a particular model of mobile device or set of mobile devices that supports the sensitive APIs required by the software application. A manufacturer, mobile communication network operator, service provider, or corporate client, for example, may thereby have signing authority over the use of sensitive APIs for their particular mobile device model(s), or for mobile devices operating on a particular network, subscribing to one or more particular services, or distributed to corporate employees. A signed software application may then include a software application and at least one appended digital signature from each of the signing authorities. Although these signing authorities would be generating a digital signature for the same software application in this example, different signing and signature verification schemes may be associated with different signing authorities.

From the perspective of code signing authority 306, code signing authority 306 will receive software application 304, and may, at its discretion, sign software application 304 to allow access to one or more sensitive APIs on the mobile device. Before code signing authority 306 signs software application 304, code signing authority 306 may consider the identity of application developer 302 in determining whether or not software application 304 should be signed. Code signing authority 306 may also review software application 304 before signing; alternatively, code signing authority 306 may choose not to perform such a review, relying on its ability to identify the identity of software application developer 302 for recourse in the event that software application 304 is found to be virus-infected or to contain destructive code, for example.

If code signing authority 306 determines that software application 304 may access the sensitive API(s) and therefore should be signed, then a digital signature (not explicitly shown) is generated by code signing authority 306 and appended to software application 304, to produce a signed software application 308 that is returned to software application developer 302. On the other hand, if code signing authority 306 refuses to sign software application 304, an appropriate response (not shown) may be returned to software application developer 302.

The digital signature is typically a tag that is generated using a private signature key 310 maintained solely by code signing authority 306. For example, according to one signature scheme, a hash of software application 304 may be generated by code signing authority 306, using a hashing algorithm such as the Secure Hash Algorithm SHA1 for example, and then encoded with private signature key 310 to create the digital signature. While private signature key 310 is used to encode a hash of information to be signed in this example, such as may be derived from software application 304, in variant schemes, private signature key 310 may be used in other ways to generate a digital signature from the information to be signed or a transformed version of the information.

Signed software application 308 may then be sent to mobile device 100 over a wireless network 200 for example, or otherwise loaded onto mobile device 100. For instance, signed software application 308 may be downloaded to a personal computer via a computer network and loaded to mobile device 100 through a serial link, or may be acquired from software application developer 302 in another manner and loaded onto mobile device 100. Once signed software application 308 is loaded on mobile device 100, at least one digital signature of signed software application 308 will then typically be verified with a public signature key 312 before software application 304 is granted access to a sensitive API.

Although signed software application 308 is loaded onto mobile device 100, it should be appreciated by persons skilled in the art that the software application that may eventually be executed on mobile device 100 is software application 304. As described above, signed software application 308 typically comprises software application 304 and one or more appended digital signatures (not shown). When the appropriate digital signatures are successfully verified (e.g. by a virtual machine at mobile device 100), software application 304 can be executed on mobile device 100 and is permitted access to any APIs for which the corresponding signatures have been verified.

Security protocols involving software code signing schemes typically rely on public and private encryption keys to provide authorization to access sensitive APIs and to guarantee the integrity of signed applications. In accordance with known public key cryptographic techniques, data encrypted using a private key of a private key/public key pair can only be decrypted using the corresponding public key of the pair, and vice-versa.

In this example, a code signing authority signs a software application by generating a digital signature. The digital signature is a digest (e.g. a hash) of the software application, or possibly of some data derived from the software application, which is encoded using the code signing authority's private key. The digital signature can then be appended to the software application.

To verify the digital signature at a mobile device or other computing device, the digest is obtained in a similar manner (e.g. using the same standard hash algorithm) from the software application (to which the digital signature is appended) that is received at the device. The code signing authority's public key, typically stored with the sensitive APIs, is used to decode the appended digital signature in order to obtain what should be a matching digest for the received software application. If the digests do not match, this suggests that either the software application received at the device is not the same application that was signed by the code signing authority, or that the software application was not signed using the correct private key or by the proper code signing authority. The digital signature algorithms are designed in such a way that only someone with knowledge of the code signing authority's private key should be able to encode a digital signature that can be decoded correctly (e.g. by a virtual machine at the device) using the code signing authority's public key that is associated with one or more sensitive APIs. Therefore, by verifying a digital signature in this way, authorization and access control to sensitive APIs and the integrity of signed applications can be maintained.

Accordingly, public signature key 312 corresponds to private signature key 310 maintained by code signing authority 306, and is typically installed on mobile device 100 along with one or more sensitive APIs. Alternatively, public signature key 312 may instead be obtained from a public key repository (not shown), using mobile device 100 or possibly a personal computer system, and installed on mobile device 100 as needed. Mobile device 100 computes a hash of software application 304 in the signed software application 308, using the same hashing algorithm as code signing authority 306, and uses the digital signature and public signature key 312 to recover the hash originally encoded by code signing authority 306. The resultant locally calculated hash and the hash recovered from the digital signature are then compared, and if the hashes are the same, the signature is verified. If software application 304 was signed multiple times, each digital signature may be verified in a similar manner. Software application 304 can then execute on mobile device 100 and access any sensitive APIs for which the corresponding signature(s) have been verified. This example signature scheme is provided by way of example only, and other signature schemes, including other public key signature schemes, may also be employed in variant implementations.

Figure 5:
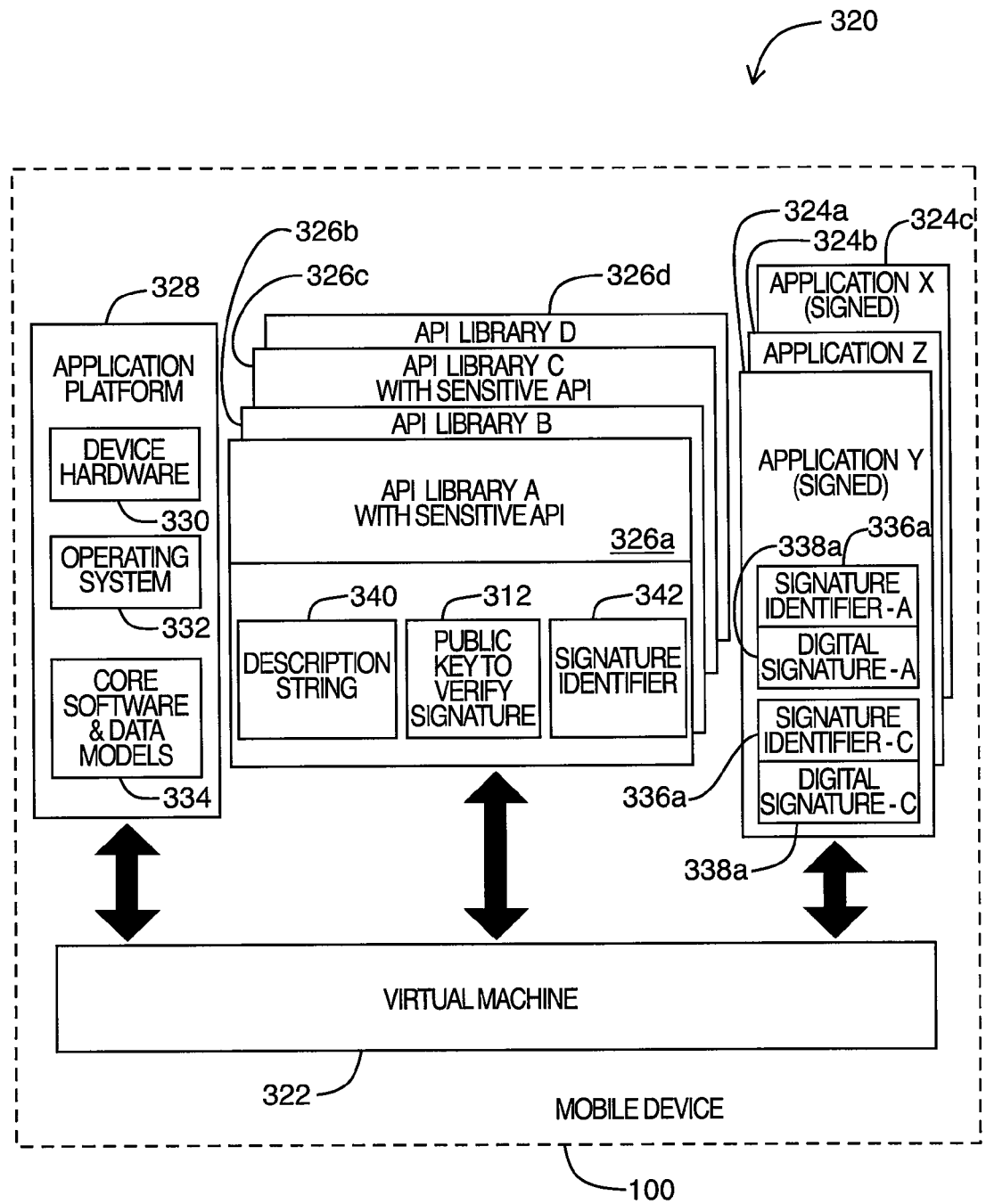
FIG. 5 is a diagram illustrating components of an example code signing system on a mobile device.

Referring to FIG. 5, a diagram illustrating components of an example code signing system on a mobile device is shown generally as 320.

In respect of mobile device 100, example code signing system 320 comprises a virtual machine 322 (e.g. a JVM), a plurality of software applications 324a-c, a plurality of API libraries 326a-d, and an application platform 328. Application platform 328 generally includes all of the resources on mobile device 100 that may be accessed by the software applications 324a-c. Application platform 328 may include, for example, device hardware 330, the mobile device's operating system 332, and core software and data models 334. Each API library 326a-d comprises one or more APIs that interface with a resource available in application platform 328. For instance, one API library might include all of the APIs that interface with a calendar program and calendar entry data models. Another API library might include all of the APIs that interface with the transmission circuitry and functions of mobile device 100. Yet another API library might include all of the APIs capable of interfacing with lower-level services performed by the mobile device's operating system 332.

Some API libraries 326a-d may expose a sensitive API (e.g. 326a, 326c), such as an interface to a cryptographic function or module, while other libraries may be accessed without exposing sensitive APIs (e.g. 326b, 326d). Similarly, some software applications 324a-324c may be signed software applications (e.g. 324a, 324c) that require access to one or more sensitive APIs, while other software applications may not be signed (e.g. 324b). Virtual machine 322 may be an object oriented run-time environment such as Sun Microsystems' J2METM (Java 2 Platform, Micro Edition) for example, which manages the execution of software applications 324a-c operating on mobile device 100, and links the software applications 324a-c to the various API libraries 326a-d.

Software application 324a, labeled as Application Y in FIG. 5, is an example of a signed software application (e.g. signed application 308 of FIG. 4). In this example, signed software application 324a includes: a software application (e.g. application 304 of FIG. 4) comprising, for example, software code that can be executed on application platform 328; one or more signature identifiers 336a; and one or more digital signatures 338a associated with the signature identifiers 336a. Software application 324c, and other signed software applications will typically comprise similar components. However, the components of signed software applications will be described in greater detail below with reference to software application 324a, by way of example.

Each digital signature 338a and associated signature identifier 336a in signed software application 324a may correspond to an API library 326a, 326c that exposes at least one sensitive API to which software application 324a requires access. In certain implementations, signed software application 324a may include a digital signature 338a for each sensitive API within a particular API library 326a, 326c. The signature identifiers 336a may be unique integers or some other identifier capable of allowing a particular digital signature 338a to be associated with a specific API library, API, application platform, or model of mobile device 100.

API library 326a, labeled as API Library A in FIG. 5, is an example of an API library that exposes a sensitive API. In this example, API library 326a includes a description string 340, a public signature key 312, and a signature identifier 342. API library 326c, and other API libraries that expose one or more sensitive APIs will typically comprise similar components. However, the components of such API libraries will be described in greater detail below with reference to API library 326a, by way of example.

Signature identifier 342 of API library 326a may correspond to a signature identifier (e.g. 336a) in a signed software application (e.g. 324a). These signature identifiers enables virtual machine 322 to quickly match a digital signature (e.g. 338a) with an API library (e.g. 326a). Public signature key 312 corresponds to the private signature key (e.g. 310 of FIG. 4) maintained by the code signing authority, and is used to verify the authenticity of the digital signature 338a appended to the signed application 324a. Description string 340 may, for example, be a textual message that is displayed on mobile device 100 when the signed software application 324a is loaded or attempts to access a sensitive API of API library 326a.

Operationally, when a signed software application that requires access to a particular sensitive API (e.g. in an API library) is loaded onto mobile device 100, virtual machine 322 searches the signed software application for an appended digital signature associated with that API. In this example, this would involve matching the specific signature identifier associated with a digital signature with the signature identifier (e.g. 342) for the corresponding API library. If the signed software application includes the appropriate digital signature, then virtual machine 322 will verify its authenticity using the public signature key 312 associated with that API library. Access to the sensitive API may then be granted to the software application that was signed, upon successful verification of the digital signature. If the signed software application does not include the appropriate digital signature, then access to the sensitive API may be denied.

Optionally, even when the appropriate digital signature is successfully verified, a mobile device operator may be prompted to provide confirmation that the sensitive API can be accessed by the software application. In that case, a message based on description string 340 may be displayed on a display of mobile device 100, before the software application is executed and accesses the sensitive API. For instance, a message stating "Application Y is attempting to access API Library A" may be displayed, and the mobile device operator may be given the control to ultimately grant or deny access to the sensitive API.

It will be understood by persons skilled in the art that any given signed software application may have multiple device-specific, library-specific, or API-specific signatures, or some combination of such signatures appended thereto. Similarly, different signature verification requirements may be configured for different devices. For example, a digital signature may be provided with a signed software application that permits access to a given sensitive API on one mobile device model, but not to the same sensitive API on a different mobile device model. This may result in the signed software application being permitted access to the sensitive API on one type of mobile device but not on another. As a further example, one mobile device may require verification of both a global signature, as well as additional signatures for any sensitive APIs to which a software application requires access in order for the software application to be executed. A different mobile device may require verification of only a global signature, and yet another different mobile device may require verification of signatures only for its sensitive APIs.

It will also be understood by persons skilled in the art that in variant implementations, certain devices capable of receiving software applications to which digital signatures are appended, including devices in which digital signature verification is not implemented or where digital signature verification is optional for example, may be adapted to permit software applications to be executed without any signature verification.

Figure 6:
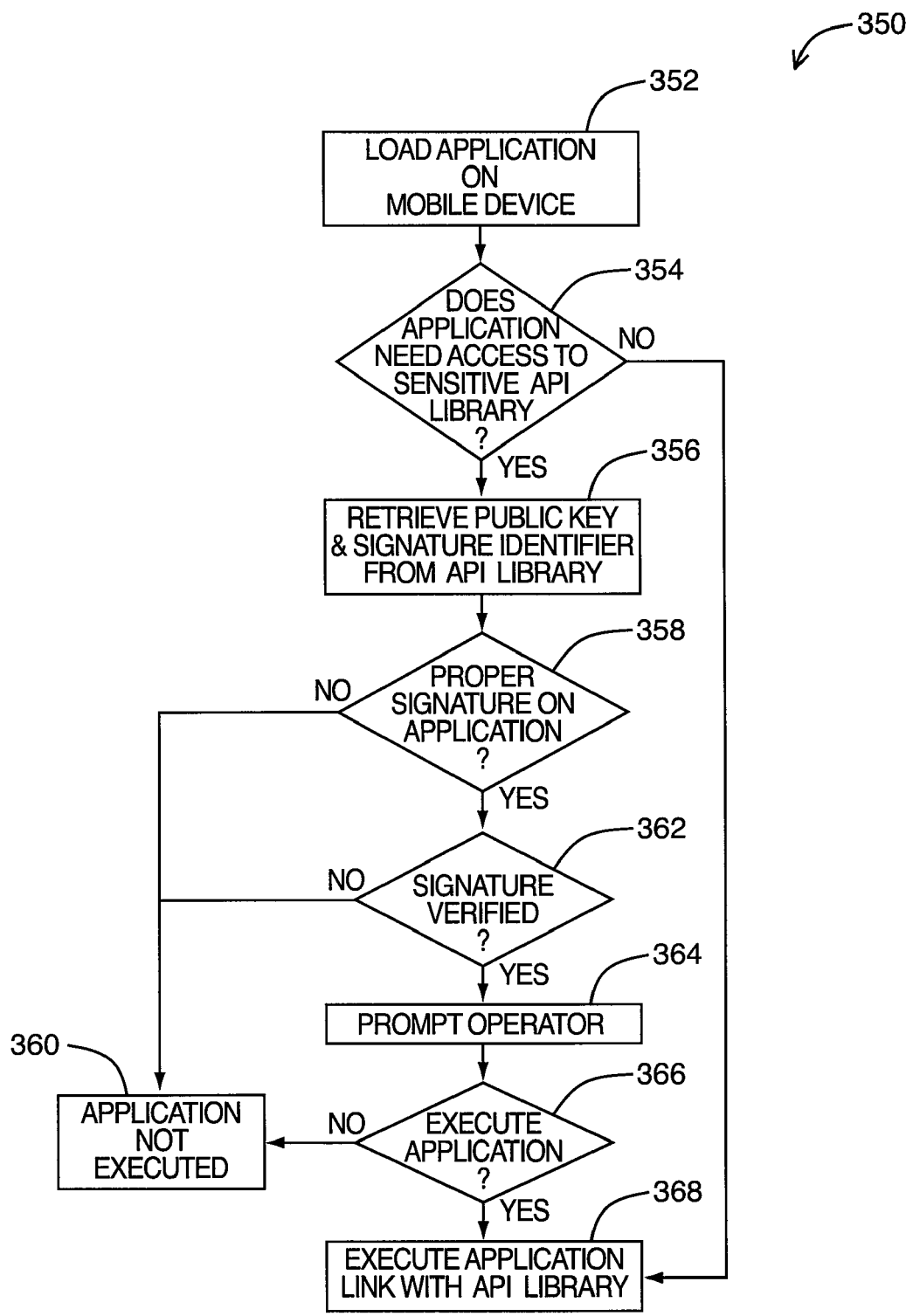
FIG. 6 is a flowchart illustrating steps in an example method of processing signed software applications performed on the mobile device depicted in FIG. 5.

Referring to FIG. 6, a flowchart illustrating steps in an example method of processing signed software applications performed on the mobile device depicted in FIG. 5 is shown generally as 350.

At step 352, a software application (e.g. application 324a of FIG. 5) is loaded onto a mobile device (e.g. mobile device 100 of FIG. 5). Once the software application is loaded, the device, using a virtual machine (e.g. virtual machine 322 of FIG. 5) for example, determines whether or not the software application requires access to any API libraries that expose a sensitive API at step 354. If the software application does require access to the sensitive API, then the virtual machine verifies that the software application includes a valid digital signature associated with the sensitive API (or associated API library) to which access is required, as described below with reference to steps 356 through 366. If not, then the software application is linked with all of its required API libraries and executed at step 368.

In this example, at step 356, the virtual machine retrieves the public signature key (e.g. public key 312 of FIG. 5) and the signature identifier (e.g. signature identifier 342 of FIG. 5) for the corresponding API library. At step 358, the signature identifier for the API library is then used by the virtual machine to determine whether or not the software application has an appended digital signature (e.g. digital signature 338a of FIG. 5) with a corresponding signature identifier (e.g. signature identifier 336a of FIG. 5). If not, then the software application has not been approved for access to the sensitive API by the appropriate code signing authority, and the software application may be prevented from being executed at step 360, or alternatively (not explicitly shown in FIG. 6), the software application may be purged from the mobile device, or executed to the extent possible without accessing the sensitive API. A user may be prompted for input before any of these alternative actions (where made available) are taken, to provide user control over the specific action to be performed (not shown).

If a digital signature corresponding to the sensitive API has been appended to the software application and is located by the virtual machine, then the virtual machine uses the public signature key to verify the authenticity of the digital signature at step 362. This step may be performed, for example, by using the signature verification scheme described with reference to FIG. 4, or other alternative signature schemes. If the digital signature does not successfully verify, then the software application is either not executed, purged, or restricted from accessing the sensitive API, as described above with reference to step 360. If the digital signature is successfully verified, however, then optionally, a message based on a description string associated with the sensitive API or corresponding API library (e.g. description string 340 of FIG. 5) is displayed to a mobile device operator at step 364, warning that the software application requires access to a sensitive API, and at step 366, optionally prompting the operator for authorization to execute the software application. If execution is authorized, then the software application may be executed and linked to the sensitive API at step 368, otherwise the software application is either not executed, purged, or restricted from accessing the sensitive API, as described above with reference to step 360.

When more than one digital signature needs to be verified for a given software application, then steps 354 through 366 may be repeated for each digital signature prior to execution of the application.

Embodiments described herein relate generally to a system and method for providing code signing services. As noted earlier, code signing services may be provided by a code signing authority (e.g. code signing authority 306 of FIG. 4) to software application developers (e.g. application developer 302 of FIG. 4) or other individuals or entities that wish to have software applications digitally signed, so that the applications may access sensitive APIs when they are executed on a computing device (e.g. mobile device 100 of FIG. 4). Examples of entities that might act as code signing authorities may include mobile device manufacturers, API authors, wireless network operators, device owners or operators, any other entities that might be affected by a virus or destructive code in software applications for the computing device or that might otherwise wish to control access to sensitive APIs, and representatives of any of the above entities.

From the perspective of the code signing authority, any given software application developer (or other individual or entity that wishes to have its applications signed) is initially an untrusted client. Until a trust relationship is established between the software application developer and the code signing authority, the code signing authority will usually refuse to sign software applications received from the software application developer that may access sensitive APIs. Only after establishing trust relationships with software application developers might a code signing authority be willing to sign software applications, as the code signing authority can then track which APIs it has granted access to, and to which software application developers such access has been granted.

Accordingly, in one embodiment, a method of providing code signing services will comprise at least some steps relating to registering the entities that seek access to sensitive APIs as controlled by the code signing authority. These steps are performed in order to establish trust relationships with those entities. The method of providing code signing services may comprise additional steps relating to receiving and processing code signing requests from such entities.

With respect to the registration of entities by the code signing authority, should any destructive or otherwise problematic code be either found in a software application or suspected because of behavior exhibited when the software application is executed on the computing device, the registration privileges of the corresponding software application developer (or other registered individual or entity) with the code signing authority may be suspended or revoked. This is made possible since the digital signature that is appended to applications by the code signing authority provides an audit trail through which the developer of a problematic software application may be identified.

Computing devices may be informed of such registration revocations by being configured to periodically download revocation lists, for example. If software applications for which the corresponding digital signatures have been revoked are running on a particular computing device, that device may then halt execution of any such software application and possibly purge the software application from its local storage. Devices may also be configured to re-execute digital signature verifications, either periodically or when a new revocation list is downloaded, for example.

In certain embodiments, the code signing authorities may not provide revocations lists or the like. A code signing authority may track which software application developers (or other registered individuals or entities) may or may not have their applications signed at any given time, and rescind signing privileges of developers at its discretion. In one example implementation, once an application has been signed by the code signing authority, that application will remain valid even if the associated developer's signing privileges are later rescinded. However, subsequent requests to sign applications made by that developer after its signing privileges have been rescinded would be denied.

Figure 7A:
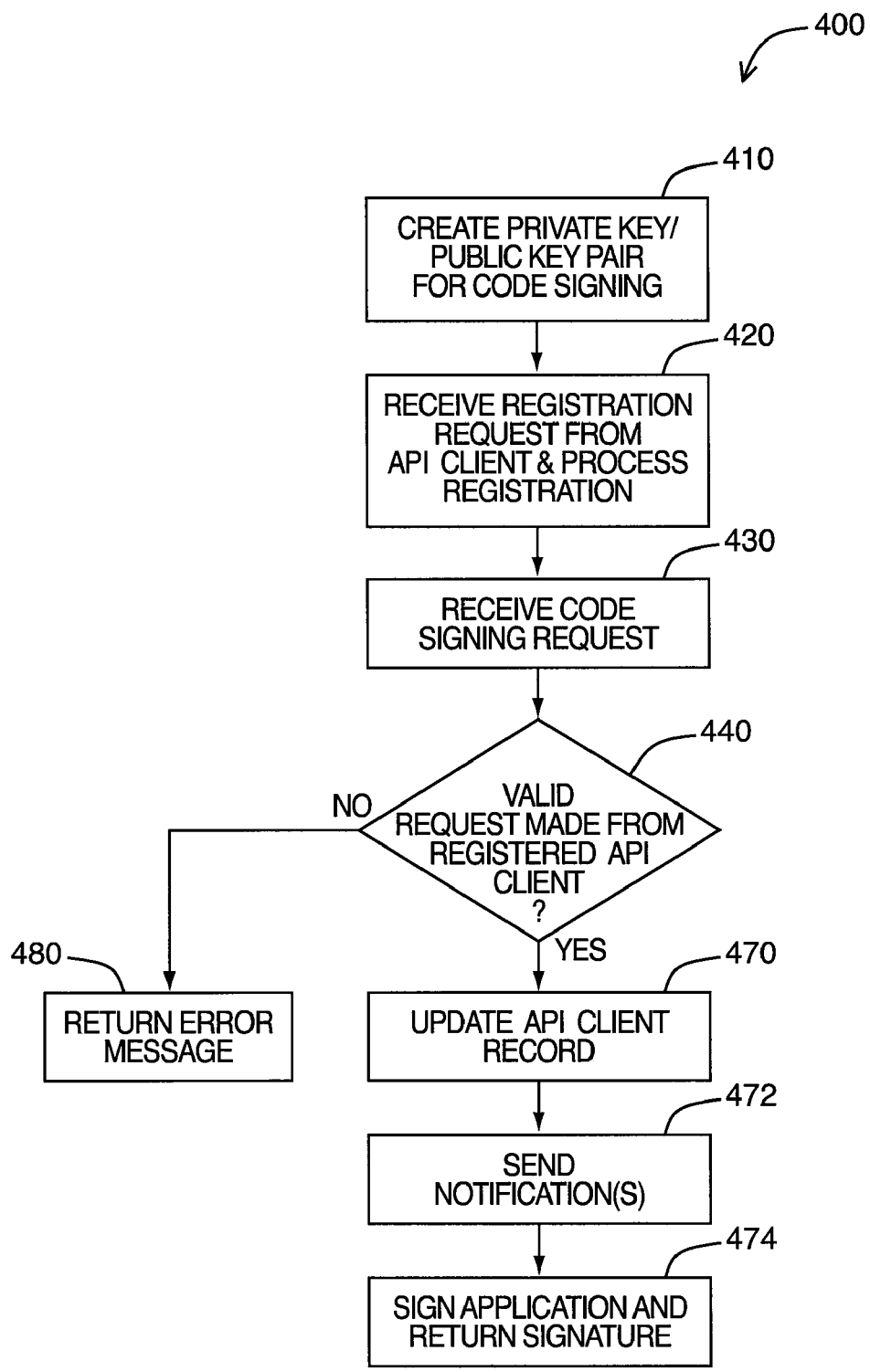
FIG. 7A is a flowchart illustrating steps in a method of providing code signing services in one embodiment.

Referring to FIG. 7A, a flowchart illustrating steps in a method of providing code signing services is shown generally as 400.

While this embodiment is described generally with reference to mobile devices by way of example, variant embodiments may be applicable to other computing devices. Moreover, while this embodiment is described generally with reference to the exchange of information between a code signing authority and software application developers, the described embodiment can also be applicable in respect of cases where such information is exchanged between the code signing authority and individuals or entities other than software application developers.

References to steps of method 400 as being performed by the code signing authority are, in typical implementations, performed by a software application, which has been programmed to perform the steps of method 400 unless otherwise noted. In this description and in the appended claims, this software application programmed to perform the steps of method 400 is referred to as a code signing authority application.

The code signing authority application is one component of a system for providing code signing services that executes on a computing device maintained by the code signing authority (e.g. code signing authority 306 of FIG. 4). The system for providing code signing services, in one embodiment, is shown in an example network configuration 450 of FIG. 7B. In this example, the code signing authority application 452 executes on a computing device 454, which in example network 450, is a web server. Code signing authority application 452 can interact with clients in the network 450 through a web interface 456 accessible via the Internet 458, for example.

The clients with which code signing authority application 452 may interact can include, for example, signature tool applications 460 and API authoring tool applications 462 executing on remote computing devices. A signature tool application 460 can be used to communicate data and applications to code signing authority application 452, by a software application developer (e.g. software application developer 302 of FIG. 4) that needs to have applications signed by the code signing authority. An API authoring tool application 462 can be used by an author of sensitive APIs, who needs to obtain one or more public signature keys from the code signing authority to protect the APIs.

It will be understood that in some embodiments, an author of sensitive APIs may also act as the code signing authority.

Code signing authority application 452 will also have access to at least one client information database 464 and at least one private signature key store 466. Data in client information database 464 and private signature key store 466 may be housed on the same storage device or distributed across multiple storage devices, which need not necessarily reside physically on computing device 454.

Figure 7B:
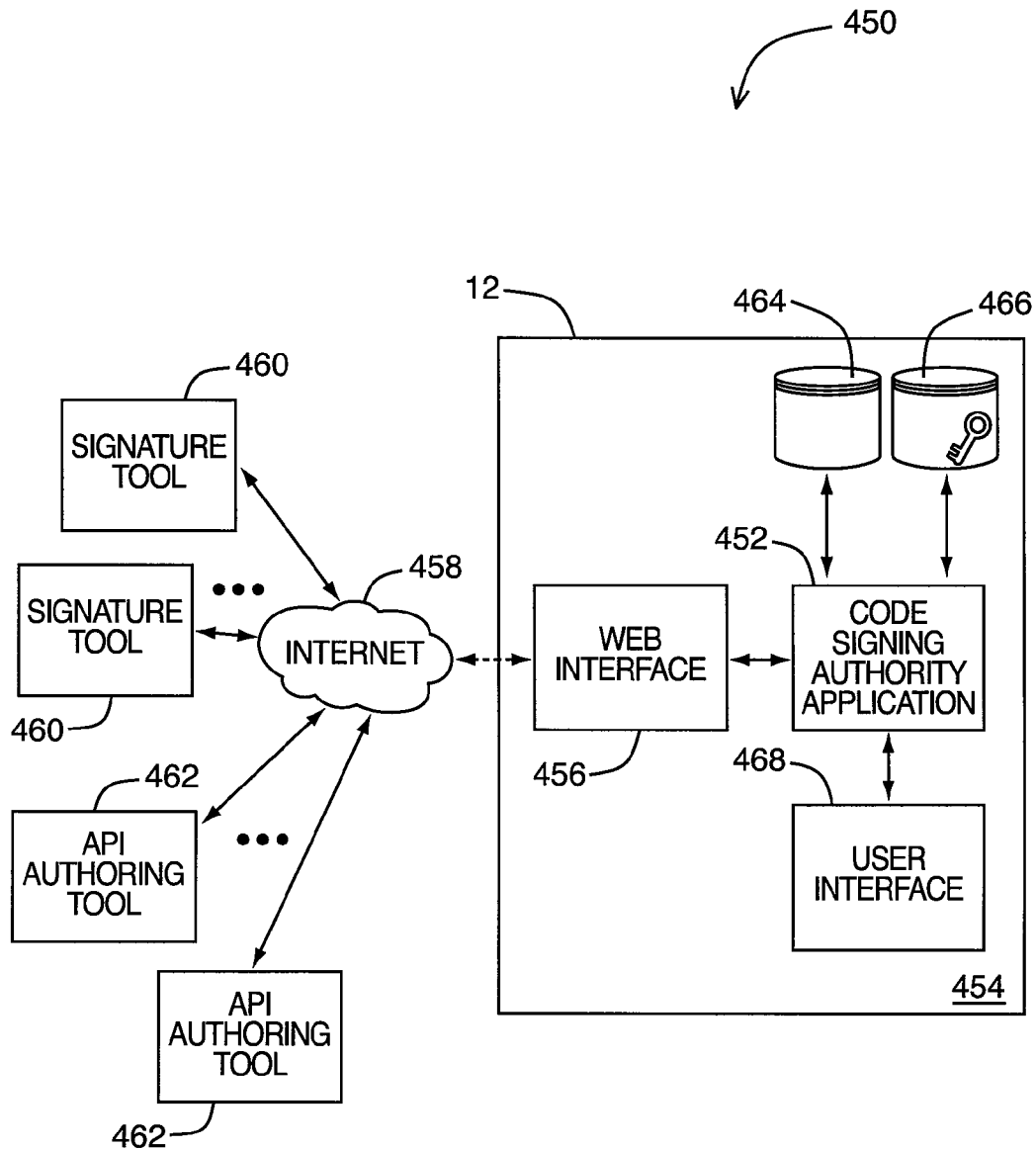
FIG. 7B is a schematic diagram illustrating a system for providing code signing services in an example network configuration.

It will be understood by persons skilled in the art that the components shown in FIG. 7B are provided by way of example only, and that computing device 454 will generally comprise other components in addition to those shown in FIG. 7B and may comprise different components in variant implementations.

Referring again to FIG. 7A, prior to receiving code signing registration requests and code signing requests from software application developers, as will be discussed in greater detail with reference to further steps of method 400, a private key/public key pair needs to first be generated, so that the public key can be attached to the APIs (e.g. classes) that are to be protected by classifying them as sensitive. The private key can be stored locally (e.g. in private key store 466 of FIG. 7B) by the code signing authority for later use. Accordingly, at step 410, which is performed prior to any steps involving code signing, a code signing authority application creates a private key/public key pair for the APIs that the code signing authority wishes to control access to. A key pair may be generated for each individual sensitive API to be protected, or the same key pair may be applied to multiple APIs, for example. As further examples, different key pairs may be generated for APIs on different devices, or for APIs on different models of the same type of device. Step 410 is described in greater detail with respect to example embodiments, with reference to FIGS. 8A through 8C.

Figure 8A:
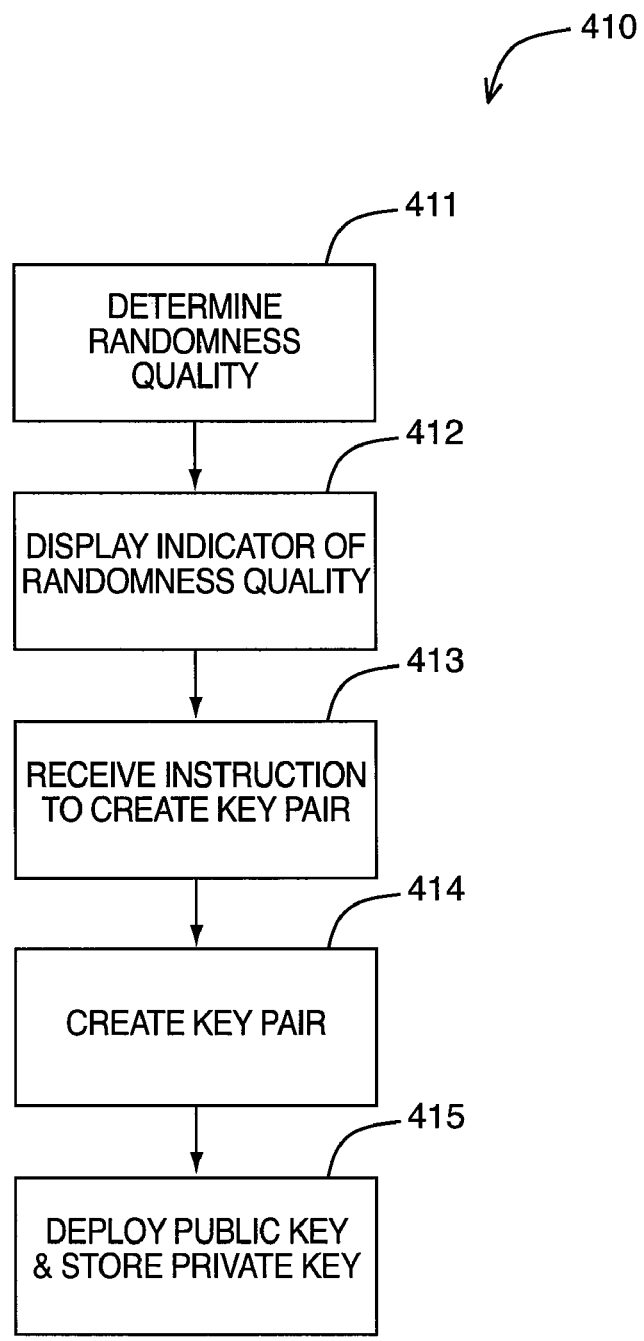
FIG. 8A is a flowchart illustrating steps in a method of creating a key pair for code signing in one embodiment.

Referring to FIG. 8A, in one embodiment, there is provided a means for determining and displaying the randomness quality of random numbers generated by a random data service on a computing device. It is understood that when a public key cryptosystem is used to generate key pairs for example, one needs a good source of random numbers for key generation. Generally, the more random the number, the stronger the generated key will be. A good source of random numbers produces numbers that are unknown and unpredictable by potential adversaries. In principle, random numbers derived from a physical process may be best, since many physical processes appear truly random.

In this embodiment, a random data service is provided that is made accessible to the code signing authority application for generating public key/private key pairs. The random data service may gather random data derived from a few different sources, including serial ports, windows cryptographic APIs, keyboard and mouse events, and hardware tokens, for example. The random data service is adapted to provide three primary functions: to gather random data, to provide random data to applications that request it, and to provide a measure of the randomness quality of the random data it has gathered.

At step 411, the randomness quality of the data provided by the random data service is determined. In this embodiment, random data that can be provided upon request is continuously gathered by the random data service. For example, while the random data service executes, random data may be generated in predefined-sized blocks (e.g. 20,000 byte blocks) continuously. At this step, the generated random data is considered (e.g. continually, by polling the random data service at some interval, such as once every 0.5 s), and statistical randomness tests can be applied to the sequence of random data blocks. Various randomness tests (e.g. a Federal Information Processing Standard (FIPS) test, FIPS 140-2) are known, and one or more of such tests may be applied to facilitate a determination of the quality of the generated random data.

Depending on the randomness test used, and the manner in which results are provided by that randomness test, it may be possible to map each result onto one of a number of predefined, qualitative measures of randomness quality. For example, the random data service may apply a predefined mapping in order to indicate the randomness quality at any given time as satisfying one of the following states: unknown, unacceptable, poor, acceptable, good, excellent, error. At step 412, this indication of randomness quality may be displayed to a user of the code signing authority application (e.g. an administrator of the code signing authority).

While an indication of randomness quality may be displayed using the names of one of the above-mentioned states, different identifiers may also be used. These states may also be further mapped into a fewer number of collective states, each identified by a descriptive identifier, in variant embodiments.

For example, in one embodiment, the randomness quality is represented as a color in a traffic light icon, which can be displayed in a user interface at step 412. This manner of representing randomness quality is intuitive and easy for a user to understand. Most users will be familiar with the traffic light icon, and this image can be used to portray the current quality of randomness of the numbers that will be used to create key pairs for code signing applications.

The traffic light icon is used to illustrate the current level of randomness quality, and can display one of three colors (e.g. red, yellow, green) based on the current level. Red represents a state in which keys should not be created because the randomness quality is very poor, or because the randomness quality cannot otherwise be verified as being good. Yellow represents a state in which the quality is poor, and one where it would not be recommended that keys be generated in a security-conscious application. Green represents a good quality of randomness, and users are advised that it is relatively safe to create keys.

One possible mapping of the seven initial states noted above into a color for the traffic light icon may be as follows:
Red: {unknown, unacceptable, error}
Yellow: {poor}
Green: {acceptable, good, excellent}

It will be understood by persons skilled in the art that other initial state sets and further mapped state sets may be defined in variant embodiments, and how they are predefined may depend on the specific randomness test(s) employed.

Figure 8B:
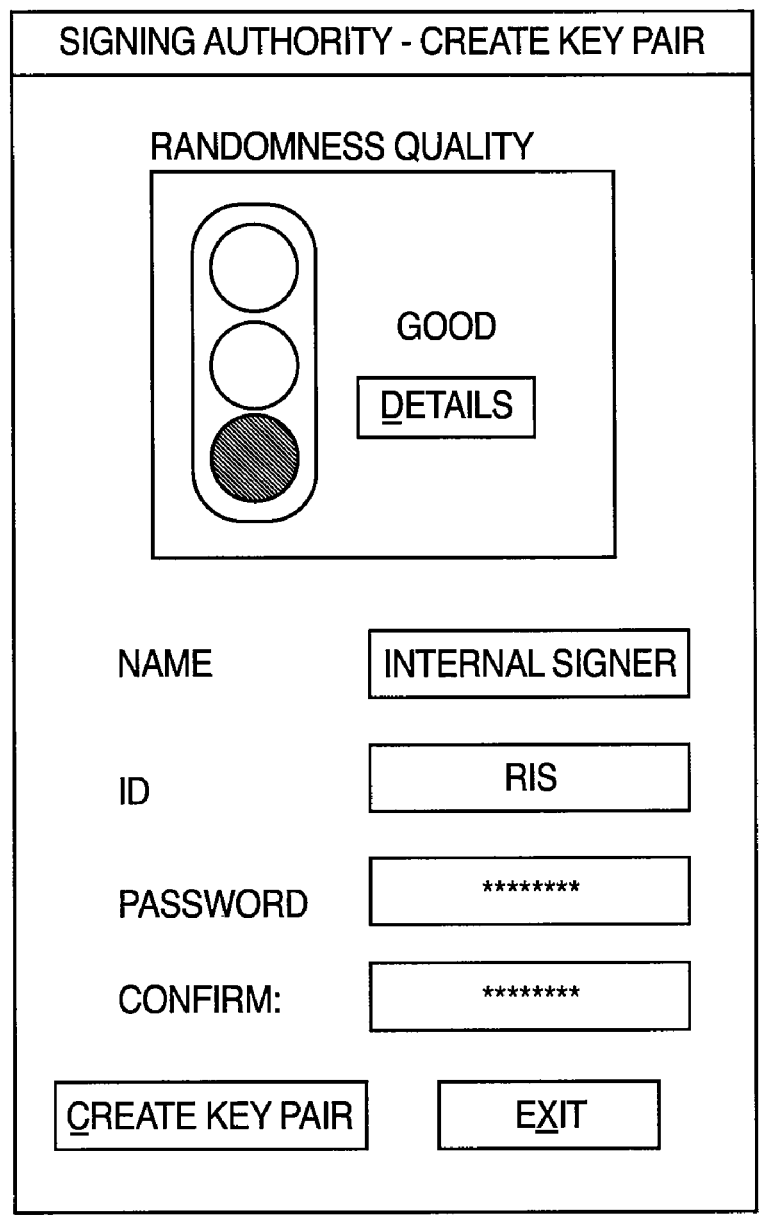

An example dialog box of a user interface in which the traffic light icon is displayed is shown in FIG. 8B. A descriptive identifier (e.g. based on one of the seven initial steps, or a different identifier corresponding to the color of the light being displayed) may also be displayed with the traffic light icon as shown. The color of the traffic light icon may be presented to a user in other ways. For example, the traffic light icon displaying a color, or only a colored circle, may be displayed in miniature on a toolbar.

After an indication of the randomness quality is displayed at step 412, a user of the code signing authority application may direct the application to create a key pair for signing (e.g. by clicking the "Create Key Pair" button of the dialog box shown in FIG. 8B). In that case, an instruction is received from the user to create a key pair. In one embodiment, the user may choose to create a key pair regardless of the state depicted by the traffic light icon. However, in variant embodiments, the option to create keys that is displayed to the user may be disabled when a "Red light" and/or a "Yellow light" is shown. Moreover, users may be asked to confirm their selections if an instruction to create a key pair is received while a Red and/or Yellow light is shown, in variant embodiments.

At step 414, a private key and a corresponding public key are created in known manner (e.g. using an RSA algorithm). At step 415, the private key is stored for future use by the code signing authority (e.g. in private key store 466 of FIG. 7B), and the public key is deployed. The public key can be attached to sensitive API(s) that the code signing authority wishes to protect, or it may store the public key in a repository, which is made available to code signing system components executing on computing devices when signature verification is required. In FIG. 8C, an example dialog box is shown, where users of the code signing authority application can send a created public key to API authors (e.g. via API authoring tool 462 of FIG. 7B) to embed in their APIs, in order to protect those APIs.

It will be understood by persons skilled in the art that the features referred to in the description of FIG. 8A, including the displayable traffic light icon for example, may be implemented in other applications adapted to use random numbers, for generating objects other than key pairs for code signing. For instance, these features may be employed in applications where personal identification numbers (PINs) are generated, or in applications where session keys (e.g. used to encrypt data in accordance with a symmetric encryption algorithm) are generated.

Referring again to FIG. 7A, after one or more public keys have been created at step 410 for association with sensitive APIs, subsequent steps of method 400 are performed when a software application developer develops an application that needs to access the APIs that have been classified as sensitive. At step 420, a registration request is received by the code signing authority application from a software application developer that wishes to access a sensitive API. This registration request is then processed and a determination as to whether the registration request should accepted. Step 420 is described in greater detail with respect to example embodiments, with reference to FIG. 9.

Figure 9:
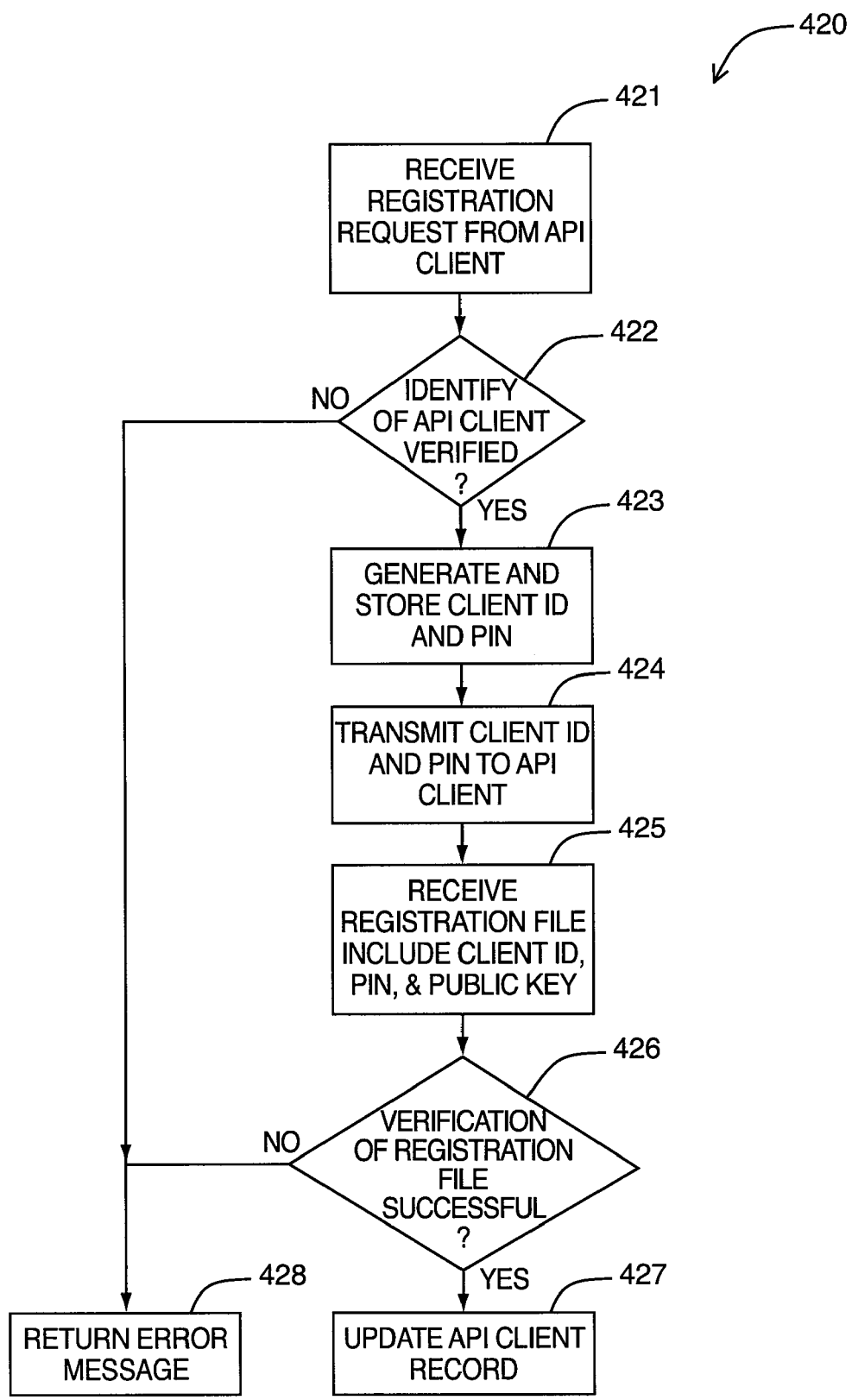
FIG. 9 is a flowchart illustrating steps in a method of registering an entity for code signing services in one embodiment.

In FIG. 9, there is provided a method of registering an entity for code signing services in accordance with one embodiment. In the example described with reference to FIG. 7A and FIG. 9, that entity is a software application developer, although it may be some other individual or entity. Directions to software application developers on how to register with the code signing authority may be made available to software application developers using known means (e.g. through an Internet website).

At step 421, a registration request is received by the code signing authority application from the software application developer ("API client"). The registration request includes information that may be used by the code signing authority to validate the identity of the software application developer. This information may include typical identification information (e.g. contact information), and may also include credit card information that can be verified by the code signing authority. This information may, for example, be received through any of a number of different bands of communication. For example, data may be exchanged via Secure Socket Layer (SSL) web forms, for example.

Information received from the software application developer is verified at step 422. For example, a credit card company may be contacted (e.g. electronically or otherwise) to validate the credit card information received.

If the verification is not successful, an error message is returned (step 428). On the other hand, if the information is successfully verified (e.g. if the credit card information supplied is successfully validated), at step 423, a unique client ID and PIN is generated by the code signing authority application. An account record for saving the client ID, PIN, and other information associated with the specific software application developer may be created for storage in a client information database (e.g. client information database 464 of FIG. 7B) maintained by the code signing authority and accessible to the code signing authority application.

In a variant embodiment, the PIN and/or client ID may be generated by the software application developer instead of the code signing authority, and shared with the code signing authority for storage at step 423.

Upon creation of the account record associated with the software application developer, the account record may also be populated with other information that may be used to manage the software application developer's account, to keep track of account activity, and to provide indications to specified parties when account activity occurs, for example. In one embodiment, when an account record is created for a given software developer, the user of the code signing authority application (e.g. an administrator of the code signing authority) may be provided with a form (e.g. via a user interface 468 as shown in FIG. 7B) that allows various details or restrictions to be associated with that software application developer's account. An example form illustrating details that may be updated in an account record by a user of the code signing authority application is shown in FIG. 10. Some of the details of the account record may be populated automatically with pre-determined default values.

Details that may be saved in an account record associated with a software application developer may include, for example, data needed to send e-mail notifications to specified email addresses (e.g. a "To:" address, a "cc:" address, a "bcc:" address, etc.). Flags may also be set to send an e-mail notification to the specified address(es) whenever a registration attempt occurs, whenever a code signing request is made, whenever an error occurs in processing a registration attempt or a code signing request, and/or whenever any irregular behavior (as may be defined in the code signing authority application) is detected to have occurred. Flags may also be set to send an e-mail notification whenever some other pre-defined event occurs. E-mail notifications allow software application developers, administrators, or other parties to monitor an account (e.g. their own account or another account), and in particular, to observe whether unauthorized code signing requests or registration attempts are being made under the account.

Other details that may be saved in an account record may include the setting for a flag that indicates that an expiry date is to be associated with the account, and the associated expiry date. These may be set by an administrator of the code signing authority, for example.

Other details that may be saved in an account record may include the setting for a flag that indicates that the account is to be granted only a specified number of allowable code signing requests, and the associated number of allowable code signing requests. These may also be set by an administrator of the code signing authority, for example. This may facilitate the provision of "pay-per-use" code signing services by the code signing authority. Accordingly, in one example implementation, a software application developer can have an application signed only so long as his account has not expired and there are allowable code signing requests (e.g. credits) remaining.

At step 424, the client ID and PIN, and potentially other registration data, are transmitted to the software application developer. While information in the registration request is received at step 421 over a first band of communication (e.g. an SSL connection), and the client ID and the other registration data (except the PIN) may be transmitted back to the software application developer over the same band of communication at step 424, in one embodiment, the PIN is instead communicated to the software application developer using an out-of-band communication means (e.g. by telephone, by fax, etc.). This out-of-band communication means is different from the band of communication used to transmit the client ID and the other registration data to the software application developer at step 424.

In the variant embodiment mentioned earlier, in which the PIN and/or client ID is generated by the software application developer instead of the code signing authority, use of this externally generated PIN and/or client ID may then be confirmed or denied at step 424. If use of the particular PIN and/or client ID is denied, an error message may be returned to the software application developer (flow to step 428 not shown).

At step 425, a registration file is received by the code signing authority application from the software application developer, which constitutes an actual registration attempt by the software application developer. The registration file includes the client ID and PIN that was transmitted to the software application developer at step 424, a public key that corresponds to a private key that only the software application developer is expected to possess, and possibly other data. In one embodiment, the registration file is received via an SSL connection.

For greater clarity, the public key/private key pair referred to at step 425 is unrelated to the private key/public key pair that is generated to sign and verify software applications as described with reference to FIG. 4. Instead, the public key received from the software application developer at step 425 is one part of a private key/public key pair (e.g. that may have been issued by a certification authority) used to exchange encoded messages between the software application developer and third parties to facilitate secure communications. In this context, the public key for secure communications can be subsequently used by the code signing authority application to verify messages, such as code signing requests, which are received from the software application developer. In fact, the registration file received at step 425 may, itself, be digitally signed using the software application developer's private key of secure communications.

The registration file received at step 425 contains not only the client ID transmitted to the software application developer at step 424 through a first communication band, but also the PIN that was communicated to the software application developer through a second, "out-of-band" communication means in accordance with an example embodiment. By using different communication channels to transmit registration details to the software application developer, there is a lower risk that third parties may come to know both the client ID and the correct PIN associated with that client ID.

When the client ID and correct PIN associated with that client ID are received at step 425 and successfully verified at step 426 by the code signing authority (i.e. the client ID and PIN in the registration file match the client ID and associated PIN for the software application developer as stored in the appropriate account record of the client information database), then it can be more safely assumed that the public key for secure communications which accompanies the received registration file does, in fact, correspond with a private key for secure communications held by the software application developer. The public key can be subsequently used by the code signing authority to verify messages that are purported to originate from the software application developer, and thus the use of public key cryptography to encode such messages provides enhanced security in communications. In particular, there would be a lower risk that a third party would be able to complete a false registration by using an intercepted client ID and PIN, and its own public key.

In variant embodiments, different information other than the PIN may be transmitted to the software application developer over the second, preferably "out-of-band" communication means. However, in these variant embodiments, the information verified by the code signing authority should nevertheless comprise some details that were transmitted to the software application developer through one communication means, and some other details that were transmitted to the software application developer through some other communication means, so that at least some of the advantages noted above may be realized.

As a further security measure, in one embodiment, the code signing authority application is adapted to keep track of the number of registration attempts made against any given software application developer's account. After a predefined number of unsuccessful registration attempts are made against an account, that account may be disabled. This is to prevent a brute force attack on the PIN that is shared (e.g. at step 424) between the code signing authority application and the software application developer.

As noted earlier, verification of the registration file is attempted by the code signing authority at step 426 (e.g. by matching the client ID and PIN received with those in saved in the corresponding account record), and a determination is made if the verification is successful. If so, then the account record associated with the software application developer is updated to reflect a successful registration at step 427; if not, an error message may be returned to the software application developer at step 428. Specifically, at step 427, the account record may be updated with the public key received at step 425, for example. This public key is stored in the account record of the software application developer in the client information database, and may be used in the future to verify communications, including code signing requests, which may be received from the software application developer by the code signing authority application.

Referring again to FIG. 7A, after a software application developer is successfully registered at step 420, software applications will typically then be submitted for signing to the code signing authority by the software application developer.

At step 430, a code signing request is received from a requestor, which is a software application developer in this example. The code signing request may include, for example, the client ID associated with the account of the software application developer, as well as the application to be signed. In one embodiment, a digital signature of the software application developer accompanies the code signing request, wherein the code signing request has been signed using the software application developer's private key. This facilitates authentication of the identity of the software application developer.

At step 440, the code signing authority application verifies that the code signing request received at step 430 is a valid request made from a registered software application developer. This step may comprise, for example, obtaining the public key associated with the received client ID and verifying the digital signature appended to the code signing request, confirming that the account identified by the client ID has not expired, and confirming that there are a sufficient number of credits indicating allowable code signing requests remaining for that account.

If it is determined that a valid request is being made, then at step 470, the account record associated with the account identified by the client ID is updated. This may comprise decrementing the number of allowable code signing requests remaining, for example. In some embodiments, information relating to the request may also be saved in a log, which may be stored in the client information database (e.g. 464 of FIG. 7B) or on some other storage device.

At step 472, notification e-mails may be sent to addresses identified in the account record in accordance with the settings in the account record.

At step 474, the application is signed by the code signing authority using the private signature key created for code signing (e.g. as created at step 410 and stored in the private key database 466 of FIG. 7B). The digital signature is also returned to the software application developer at step 474, so that the digital signature may be appended to the application that has been programmed to access sensitive APIs that are protected with the corresponding public signature key. The code signing authority application may also be configured to forward the file containing the digital signature to other parties at this step.

In embodiments where the code signing authority may control access to different APIs protected by different public signature keys, indication of the digital signatures that need to be generated may be included in a code signing request, and the appropriate private signature key can be used accordingly to sign the application at step 474.

If it determined at step 440 that a valid request has not been made, then an error message is returned at step 480. A notification e-mail may be sent at this step depending on the account settings.

It will be understood that any actions taken by a user of the code signing authority application (e.g. an administrator), including the modification of account records or the initiation of a code signing key pair creation for example, may be conditional upon successful verification of a user password or upon the provision of some other access control mechanism.

It will be understood that steps 430 through 480 may be repeated where multiple code signing requests are received from the same software application developer, and that steps 420 through 480 may be repeated where code signing services are provided to multiple software application developers.

While a digital signature generated by the code signing authority is dependent upon authentication of the software application developer and confirmation that the software application developer has been properly registered in at least some of the embodiments described herein, it will be understood that the digital signature is generated from a hash or otherwise transformed version of the software application and is therefore application-specific. This is in contrast to some known code signing schemes in which API access is granted to all software applications received from trusted software application developers or authors, without regard to the specific application being signed. In the embodiments of the systems and methods described herein, API access is granted on an application-by-application basis and thus can be more strictly controlled or regulated.

In at least some example embodiments described herein, the code signing authority receives a software application from a software application developer for signing with a code signing request. That application is then signed by the code signing authority once the identity of the code signing requestor is authenticated, and certain account information of the requester has been verified. Signing of the application typically involves the generation of a hash (or otherwise transformed version of the software application) by the code signing authority, and the subsequent encoding of the hash with the appropriate private signature key.

However, in another embodiment, the application to be signed by the code signing authority is not received as part of the code signing request. Instead, a hash (or otherwise transformed version of the software application) is received with the code signing request, where the hash has been generated by an individual or entity other than the code signing authority, such as the software application developer himself for example, using the same hashing algorithm that the code signing authority would have otherwise used had the actual application been received by the code signing authority for signing. The hash can then (subject to account verification) be encoded using the appropriate private key by the code signing authority. Since the original application is never received by the code signing authority in this embodiment, software application developers need not fear disclosing confidential algorithms or data. Furthermore, the code signing authority may benefit since any risks associated with the applications may be left to remain with the software application developers. The code signing authority would then typically be under no obligation to check or verify code integrity, or to ensure that privacy policies are adhered to, for example, since it never receives the actual applications that it would sign. This technique also reduces the amount of data that the code signing authority application needs to handle when processing code signing requests.

The steps of one or more of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method for generating encryption key pairs in a system implemented on a computing device from random number data generated by a random data service accessible to the computing device, the method comprising:

retrieving random number data from the random data service;

applying one or more randomness tests to the retrieved random number data to compute at least one test result;

associating the at least one test result with at least one of a plurality of states indicative of the randomness quality of the random number data to determine an indication of randomness quality of the random number data for display;

displaying said indication of the randomness quality of the random number data in a user interface at the computing device;

if said indication is one of a predefined set of one or more indications, providing, in the user interface, an option to create an encryption key pair, awaiting a selection of the option to create the encryption key pair, and receiving at the system an instruction to create the encryption key pair, in response to said displaying of said indication of the randomness quality of the random number data in the user interface and the selection of the option to create the encryption key pair; and if said indication is not one of the predefined set of one or more indications, not providing, in the user interface, the option to create the encryption key pair.

2. The method of claim 1, wherein the system is provided as a code signing services system for providing code signing services to entities that wish to have software applications digitally signed.

3. The method of claim 1, wherein the plurality of states comprises more than two states.

4. The method of claim 1, wherein said displaying said indication of the randomness quality of the random number data comprises displaying an identifier or name of said at least one of a plurality of states indicative of the randomness quality of the random number data.

5. The method of claim 1, wherein the plurality of states indicative of the randomness quality of the random number data are mapped into a fewer number of collective states each identified by a descriptive identifier.

6. The method of claim 1, wherein said associating comprises associating the at least one indicator with at least one of said plurality of states represented by a color and said displaying comprises displaying the color associated with said at least one indicator.

7. The method of claim 6, wherein said associating comprises associating the at least one indicator with one of three states, wherein the first state is represented by red, the second state is represented by yellow, and the third state is represented by green.

8. The method of claim 6, wherein said displaying comprises displaying the color associated with the at least one indicator in a traffic light icon.

9. The method of claim 8, wherein the plurality of states comprises seven states and the method further comprises collectively mapping the seven states to respective colors of the traffic light icon.

10. The method of claim 8, wherein a descriptive identifier associated with the at least one indicator is displayed with said traffic light icon.

11. The method of claim 6, further comprising preventing the generation of a key pair in response to a user instruction when a pre-defined color is displayed at the displaying step.

12. The method of claim 1, wherein the key pair comprises a public and a private key pair generated by a code signing services system and wherein the system stores the private key for use by the system and attaches the public key to digitally signed software applications or makes the public key available to code signing system components requiring the public key for verifying digitally signed software applications.

13. A non-transitory computer-readable storage medium comprising instructions for causing a computing device to perform a method for generating encryption key pairs comprising:

retrieving random number data from the random data service;

applying one or more randomness tests to the retrieved random number data to compute at least one test results;

associating the at least one test result with at least one of a plurality of states indicative of the randomness quality of the random number data to determine an indication of randomness quality of the random number data for display;

displaying said indication of the randomness quality of the random number data in a user interface at the computing device;

if said indication is one of a predetermined set of one or more indications, providing, in the user interface, an option to create an encryption pair, awaiting a selection of the option to create the encryption pair, and receiving at the system an instruction to create the encryption key pair, in response to said displaying of said indication of the randomness quality of the random number data in the user interface and the selection of the option to create the encryption pair; and if said indication is not one of the predetermined set of one or more indications, not providing, in the user interface, the option to create the encryption key pair.

14. A computing device for generating encryption key pairs from random number data generated by a random data service accessible to the computing device, the computing device comprising a processor and a memory, said processor configured to:

retrieve random number data from the random data service;

apply one or more randomness tests to the retrieved random number data to compute at least one test result;

associate the at least one test result with at least one of a plurality of states indicative of the randomness quality of the random number data to determine an indication of randomness quality of the random number data for display;

display said indication of the randomness quality of the random number data in a user interface at the computing device;

if said indication is one of a predefined set of one or more indications, provide, in the user interface, an option to create an encryption key pair, await a selection of the option to create the encryption key pair, and receive at the system an instruction to create the encryption key pair, in response to said displaying of said indication of the randomness quality of the random number data in the user interface and the selection of the option to create the encryption key pair; and if said indication is not one of the predefined set of one or more indications, not provide, in the user interface, the option to create the encryption key pair.

* * * * *